(12) United States Patent
Høyer

(10) Patent No.: US 10,328,436 B2
(45) Date of Patent: Jun. 25, 2019

(54) MAGNET APPARATUS FOR GENERATING HIGH GRADIENT MAGNETIC FIELD

(71) Applicant: GIAMAG TECHNOLOGIES AS, Kjeller (NO)

(72) Inventor: Henrik Høyer, Lillestrøm (NO)

(73) Assignee: Giamag Technologies AS, Kjeller (NO)

( * ) Notice: Subject to any disclaimer, the term of this patent is extended or adjusted under 35 U.S.C. 154(b) by 0 days.

(21) Appl. No.: 15/529,601

(22) PCT Filed: Nov. 27, 2015

(86) PCT No.: PCT/EP2015/077966
§ 371 (c)(1),
(2) Date: May 25, 2017

(87) PCT Pub. No.: WO2016/083602
PCT Pub. Date: Jun. 2, 2016

(65) Prior Publication Data
US 2017/0259277 A1    Sep. 14, 2017

(30) Foreign Application Priority Data

Nov. 27, 2014  (GB) .................................. 1421078.5
Oct. 19, 2015  (GB) .................................. 1518428.6

(51) Int. Cl.
*B03C 1/28*    (2006.01)
*H01F 7/02*    (2006.01)
(Continued)

(52) U.S. Cl.
CPC ............ *B03C 1/0332* (2013.01); *B03C 1/288* (2013.01); *F16C 32/0423* (2013.01);
(Continued)

(58) Field of Classification Search
CPC ... B03C 1/0332; B03C 1/228; B03C 2201/18; B03C 2201/20
(Continued)

(56) References Cited

U.S. PATENT DOCUMENTS 3,233,950 A * 2/1966 Baermann ........... F16C 32/0427
                                                    310/90.5
3,791,864 A    2/1974 Steingroever
(Continued)

FOREIGN PATENT DOCUMENTS

DE          1017871 B      10/1957
DE          10255893 A1     6/2004
(Continued)

OTHER PUBLICATIONS

International Search Report and Written Opinion dated Feb. 17, 2016 for International Application Serial No. PCT/EP2015/077966, International Filing Date: Nov. 27, 2015 consisting of 11-pages.
(Continued)

*Primary Examiner* — Terrell H Matthews
(74) *Attorney, Agent, or Firm* — Christopher & Weisberg, P.A.

(57) ABSTRACT

A magnet apparatus for generating a high gradient and/or high strength magnetic field, comprises: two permanent magnets (2, 4) located side-by-side with oppositely oriented magnetic field polarities and end surfaces of opposite polarities next to one another, wherein the magnetic anisotropy of the magnets exceeds the magnetic induction of the material of the magnets; and a mask (6) or masks (6) on a first end of each of the adjacent permanent magnets (2, 4), the mask(s) 6 comprising a non-retentive material covering adjacent end surfaces of the two permanent magnets (2, 4) with a gap (8) along a joining line between the two permanent magnets (2, 4) to form a zone of high-gradient magnetic
(Continued)

field above the joining line; wherein the mask(s) (6) are embedded within the magnets (2, 4) and/or have a varying thickness and wherein the mask(s) (6) each have a maximum thickness greater than a tenth of the thickness of the respective magnet (2, 4).

34 Claims, 25 Drawing Sheets

(51) Int. Cl.
   *B03C 1/033* (2006.01)
   *F16C 32/04* (2006.01)

(52) U.S. Cl.
   CPC ........... *H01F 7/021* (2013.01); *H01F 7/0273* (2013.01); *B03C 2201/18* (2013.01); *B03C 2201/20* (2013.01)

(58) Field of Classification Search
   USPC ....................................................... 209/214
   See application file for complete search history.

(56) References Cited

U.S. PATENT DOCUMENTS

| | | | |
|---|---|---|---|
| 3,958,842 A | | 5/1976 | Telle |
| 4,072,370 A | | 2/1978 | Wasson |
| 4,511,777 A | * | 4/1985 | Gerard ................... H05B 6/109 219/618 |
| 4,948,208 A | | 8/1990 | Schubert |
| 5,897,783 A | | 4/1999 | Howe et al. |
| 5,976,369 A | * | 11/1999 | Howe ..................... B03C 1/035 210/222 |
| 6,844,378 B1 | | 1/2005 | Martin et al. |
| 2005/0116194 A1 | | 6/2005 | Fuchs et al. |
| 2008/0292862 A1 | | 11/2008 | Filippov et al. |
| 2010/0012591 A1 | * | 1/2010 | Glebov ................. B03C 1/0332 210/695 |
| 2010/0047547 A1 | | 2/2010 | Shimizu |
| 2013/0026872 A1 | * | 1/2013 | Cirani ................... H02K 1/2766 310/156.08 |
| 2014/0163664 A1 | * | 6/2014 | Goldsmith ....... A61B 17/00491 623/1.11 |
| 2016/0108957 A1 | * | 4/2016 | Helgesen ............ F16C 32/0425 310/90.5 |

FOREIGN PATENT DOCUMENTS

| | | | | |
|---|---|---|---|---|
| DE | 202010010105 U1 | 10/2010 | | |
| DE | 102012014629 A1 | * 1/2014 | ............... | B03C 1/23 |
| DE | 102012014629 A1 | 1/2014 | | |
| EP | 0589636 A1 | 3/1994 | | |
| EP | 1842596 A1 | 10/2007 | | |
| GB | 946701 A | 1/1964 | | |
| GB | 2097096 A | 10/1982 | | |
| JP | S54139007 A | 10/1979 | | |
| JP | 2002333018 A | 11/2002 | | |
| JP | 2004270673 A | 9/2004 | | |
| SU | 526388 A1 | 8/1976 | | |
| WO | 2009040895 A1 | 4/2009 | | |
| WO | 2014001332 A1 | 1/2014 | | |
| WO | 2014001334 A1 | 1/2014 | | |
| WO | 2014191323 A1 | 12/2014 | | |

OTHER PUBLICATIONS

Uk Search Report dated May 21, 2015 for International Application No. GB1421078.5 consisting of 1-page.

"Permanent magnet systems with strong stray magnetic fields and very high gradients for material separation." Phys. Stat. Sol. (a) 203, No. 7, 1556-1560 (2006).

International Search Report and Written Opinion dated Oct. 29, 2014 for International Application Serial No. PCT/EP2014/060707, International Filing Date May 23, 2014 consisting of 12-pages.

Norwegian Search Report dated Nov. 14, 2013 for International Application No. 20130733 consisting of 2-pages.

Roth, "Characterization and use of permanent magnets with extremely strong field gradients", May 24, 2009.

International Search Report and Written Opinion dated Jan. 2, 2017 for International Application Serial No. PCT/EP2016/075055, International Filing Date Oct. 19, 2016 consisting of 12-pages.

International Search Report dated Jul. 26, 2013 for International Application Serial No. PCT/EP2013/063276, International Filing Date Oct. 19, 2016 consisting of 3-pages.

United Kingdom Search Report dated Jan. 6, 2016 for Application No. GB1518430.2 consisting of 4-page.

International Search Report dated May 8, 2013 for International Application Serial No. PCT/EP2013/063279, International Filing Date Jun. 25, 2013 consisting of 4-pages.

\* cited by examiner

MAGNET APPARATUS FOR GENERATING HIGH GRADIENT MAGNETIC FIELD

CROSS-REFERENCE TO RELATED APPLICATIONS

This application is a Submission under 35 U.S.C.§ 371 for U.S. National Stage Patent Application of, and claims priority to, International Application Number PCT/EP2015/077966 entitled MAGNET APPARATUS FOR GENERATING HIGH GRADIENT MAGNETIC FIELD, filed Nov. 27, 2015, which is related to and claims priority to United Kingdom Patent Application Number 1518428.6, filed on Oct. 19, 2015 and United Kingdom Patent Application Number 1421078.5, filed on Nov. 27, 2014, the entirety of all of which are incorporated herein by reference.

The current invention relates to a magnet apparatus for generating a high gradient and/or a high strength magnetic field and in some examples for separation of particles.

Magnetic devices are used in various industries, and different applications require different characteristics for the magnetic field. In a number of instances it is an advantage to provide a magnet apparatus that generates a high gradient magnetic field. One advantageous use of a high gradient magnetic field is for separation of particles, and in particular particles of materials that have differing paramagnetic and/or diamagnetic properties. Another advantageous use of a high gradient magnetic field is for magnetic bearings, where the magnetic forces are used to allow for a rotating or sliding movement of one mechanical part relative to another, without direct contact of the parts.

US 2010/0012591 discloses a prior art magnet apparatus for separation of paramagnetic and diamagnetic substances. The apparatus uses a Kittel open domain type magnetic structure with two rectangular permanent magnets placed side-by-side with magnetic field polarities that are oppositely directed. The magnets are mounted on a common base comprising a plate made of a non-retentive material. The base mates with the lower faces of the magnets. The apparatus also includes thin plates made of a non-retentive material, which are placed on the top faces of the magnets with a small gap arranged along the top of the join between the magnets. This apparatus provided a significant advance in the provision of magnet devices with a high gradient magnetic field, but nonetheless it would be beneficial to provide an improved device.

Viewed from a first aspect, the invention provides a magnet apparatus for generating a high gradient and/or high strength magnetic field, the magnet apparatus comprising: two permanent magnets located side-by-side with oppositely oriented magnetic field polarities and end surfaces of opposite polarities next to one another, wherein the magnetic anisotropy of the magnets exceeds the magnetic induction of the material of the magnets; and a mask or masks on a first end of each of the adjacent permanent magnets, the mask(s) comprising a non-retentive material covering adjacent end surfaces of the two permanent magnets with a gap along a joining line between the two permanent magnets to form a zone of high-gradient magnetic field above the joining line; wherein the mask(s) are embedded within the magnets and/or have a varying thickness and optionally wherein the mask(s) have a maximum thickness greater than a tenth of the thickness of the respective magnet.

With this arrangement the characteristics of the magnetic field are improved compared to those of the prior art arrangement of US 2010/0012591, which uses a non-embedded and flat mask with constant thickness and proposes a thinner mask as the preferred embodiment. It has been found that it is important to avoid saturation of the mask in order to obtain the best results. If the mask is too thin then the mask may be saturated. For this reason a preferred minimum thickness for the mask is set based on the size of the respective magnet, i.e. the magnet upon which the mask is located. The geometry of the mask is also significant. A mask with varying thickness and/or embedding of the mask into the magnets has been found to generate improvements in the magnetic field. The maximum thickness of the mask is the largest thickness of the mask where it is placed on the magnet, including any thickness embedded in the magnet as well as any thickness extending above the maximum extent of the magnet.

There may be two masks, one on each of the magnets, with the gap formed between the masks. This is a preferred arrangement for providing a high strength magnetic field. In another arrangement there may be more than two masks spaced apart from each other and placed in strips across the end surfaces of the two magnets with gaps in between. This can generate increased peaks in magnetic field gradient. It is also possible to have a single mask with the gap formed as a hole within the mask over the joining line. A further possibility is to have a number of small masks placed in an array on the end surfaces of the two magnets, for example as a series of discrete masks with two lines of masks along either side of the joining line, or as an array extending across the surfaces of the magnets. The discrete masks may be any shape, for example rectangular, circular and so on. It should be noted that it is only required for a part of the end surfaces of the magnets to be covered by the masks. There can also be an area or several areas of the magnets where the end surface is not covered by a mask.

In some examples the varying thickness and/or embedding is utilised such that the exposed surface of the mask meets and intersects with the exposed end surface of the magnet at the edge of the mask adjacent to the gap, for example such that there is no 'step' between the surfaces. The exposed surface of the mask in this instance is the main surface of the mask and in the example embodiments there may be no side or edge surface of the mask where the mask meets the gap. The angle between a tangent to the mask surface and a tangent to the magnet surface at the meeting point of the surfaces may be less than 60 degrees, preferably less than 45 degrees and more preferably less than 30 degrees. In cases where the mask is fully embedded into the magnet then the angle between the tangents may be about zero degrees. By removing the 'step' at the gap one allows the accessible active area, for example the area where a sample might be placed, to be closer to the magnet where the magnetic field will be higher.

It is also preferred, in some cases, for the masks to each have a maximum thickness that is greater than a half of the width of the gap or greater than the full width of the gap. This can aid in avoiding saturation of the masks, although in some cases, for example with thinner magnets, then masks thinner than the gap width can be effective. The thickness of the masks would typically be less than five times the width of the gap. Thus, the thickness of the masks might be between a half and five times the width of the gap, or perhaps between one and five times the width of the gap.

The masks are relatively thick compared to the thickness of the respective magnets (i.e. the depth of the magnets from the first ends thereof to second ends thereof). In some examples, the thickness of the mask may be greater than a fifth of the thickness of the magnet, more preferably greater than a third, and possibly greater than a half. As noted above the thickness of the mask is important in avoiding saturation and therefore the minimum thickness may beneficially be set based on the thickness of the related magnet. In the prior art, for example in US 2010/0012591, the mask thickness is always considerably less than a tenth of the depth of the magnets.

Typically the magnet apparatus would be arranged symmetrically about the join between the two magnets, with the set of magnets and the associated masks having substantially the same dimensions, and the gap being centred on the join. Thus the two magnets may have the same thicknesses and shapes and the two masks may have the same thicknesses and shapes. This gives a symmetrical magnetic field. However, for some applications a non-symmetrical arrangement could be used in order to provide a non-symmetrical magnetic field, for example for non-symmetrical forces in a magnetic bearing or for making a paired set of non-symmetrical fields when two opposed sets of magnets are used as described in more detail below. Hence, where the shape of the masks is discussed herein it should be understood that this may be in the context of two or more symmetrical masks with the same shape, or optionally two or more different masks where the shapes and thicknesses may be different.

The use of two magnets is a minimum and the apparatus may include more than two magnets with more than one gap. There may be three or more magnets arranged side-by-side with adjacent magnets having oppositely oriented polarities, and masks for each magnet with gaps along the each of joining lines between side-by-side magnets. Thus, for example, there may be three magnets with two joining lines and hence two gaps, or four magnets with three joining lines and hence three gaps. This arrangement can create multiple regions with a high magnetic field and/or high magnetic field gradient. Each mask and each magnet can be the same or the masks and magnets may vary in shape and size.

The size of the gap width relative to the depth of the magnets may also be important in order to avoid saturation of the masks. Hence, in preferred examples the gap width may be may be greater than a tenth of the thickness of the magnet, more preferably greater than a fifth, optionally greater than a third and possibly greater than a half. Thus, in some embodiments both the gap width and the thickness of the masks are relatively large compared to the size of the magnets, and also the thickness of the magnets is between one and five times the width of the gap.

The absolute size of the mask and also of the gap may vary depending on the scale of the magnet apparatus. For typical applications the mask may be at least 0.5 mm thick, preferably more than 1 mm thick and/or the gap may be at least 0.5 mm thick, preferably more than 1 mm thick.

The masks may be embedded in the magnets, or they may have a varying thickness, or the masks may include both embedded parts and a varying thickness.

One or both masks may have a part or the whole of its depth embedded in a recess in the respective magnet. By embedded, it is meant that at least a part of the mask is recessed into the magnet beyond the extent of the magnet at the gap. Thus the magnet may be effectively thinner where there is an embedded part of the mask and thicker at the gap. The recess may have a constant depth, for example with a mask of rectangular section embedded in the top of the magnet. Alternatively, the recess may have a varying depth and optionally curved lower surface, to house a mask of varying thickness. The mask may comprise one unitary part, with a portion of that part embedded in the magnet and a portion extending beyond the extent of the magnet at the gap. One example embodiment includes a mask, or part of a mask, with a rectangular cross-section embedded in a recess of corresponding cross-section in the magnet.

The masks have a varying thickness in some examples. Optionally the masks are both embedded and have a varying thickness. The use of a varying thickness allows for an improved magnetic field. Some possible arrangements use a mask with a wedge shaped or triangular cross-section. It is preferred for the thickness of the mask close to the gap to be less than the maximum thickness of the mask. Thus, one or both of the masks may have a tapering thickness close to the gap, for example a mask with a trapezium cross-section where the parallel sides of the trapezium form the exposed and embedded surfaces with at least the end of the trapezium close to the gap having an angled profile. If the mask is embedded then the trapezium cross-section should have an acute internal angle at the outside surface of the mask and an obtuse internal angle at the embedded surface of the mask. One or both masks may have a curved surface. The curved surface may be the exposed surface of the mask with the opposite surface being flat and confronting a flat surface of the magnet. This can be easy to manufacture as the mask material will generally be relatively easy to manufacture with a curved shape, for example by machining and/or casting, whereas the magnet material may be harder to form into a curve. However there can also be advantages in having a curved lower surface recessed into the magnet, in combination with a curved or a flat exposed surface of the mask.

The curved surface of the mask may comprise a convex surface. One preferred arrangement uses a mask with a rounded exposed surface such that the mask has a cross-section enclosed by an arc, such as an arc of a circle or a parabola, for example.

The curved surface of the mask may comprise a concave surface. One preferred arrangement includes a curved cut-out section in the mask, with the curved cut-out section defined by an arc such as an arc of a circle or a parabola for example. The use of a curved cut-out can allow for the mask and optionally the magnets to be closely fitted to a curved vessel, such as a sample vessel. With this arrangement it is preferred for the magnets to also have a correspondingly curved surface where they are exposed at the gap. One possibility is for the masks, and optionally also the magnets, to have cut-outs that together form part of the circumference of a cylinder centred above the join between the magnets. In this case the masks can hold a cylindrical vessel and the magnetic field formed within the cylindrical vessel can be used effectively, for example for separation of particles.

In some cases the mask(s) may comprise layers of materials. For example, the mask(s) may include a sandwich structure using different materials, such as a high saturation, low permeability material closest to the magnet, followed by a layer of a medium saturation and medium permeability material, and follow by a low saturation, high permeability material.

In some examples the apparatus includes a mask with one surface in contact with the magnet, an air gap at the other surface of the mask, and a further mask layer beyond the air gap. This can be repeated, with additional air gaps and additional mask layers. The air gap may have a varying thickness. The further mask layer(s) may have varying thickness.

It may also be advantageous to have an additional magnet layer. Thus, the apparatus may comprise the side-by-side magnets and masks, with the masks having one surface of the masks in contact with the respective magnet, and the apparatus including an additional magnet layer at the other surface of each mask. The additional magnet layers preferably have a gap between them coincident with the gap between the masks. There may be a further masking element placed in the gap between the additional magnet layers. Thus, the apparatus may form an enclosed space at the gap, between the main side-by-side magnets, the two masks on these magnets, the two additional magnets and the further mask element in the gap between the additional magnets. It should also be understood that this feature is not limited to the use of just two magnets side-by-side with a single gap, there may be more than two magnets with more than one gap as discussed above, and additional magnet layers for each main magnet. There may be an air gap between the masks and the additional magnet layer. The additional magnet layer may have its own masks and/or a yoke.

The side-by-side magnets may be mounted on a yoke that is joined to the magnets at the opposite end to the masks. The yoke may therefore form a common base for the two magnets. The yoke may be made of a non-retentive material, for example a soft-iron material. Alternatively, the yoke may be made of a permanent magnet material, preferably with its polarity aligned with the direction of the magnetic field, i.e. with the north pole of the yoke directed toward the side with the south pole of the main permanent magnet at the opposite end to the masks and the south pole of the yoke directed toward the side with the north pole of the main permanent magnet at the opposite end to the masks. The yoke both supports the magnets and also improves the magnetic field formed at the opposite end at the gap in the mask. The thickness of the yoke may be similar to the thickness of the masks, for example the yoke may be between a half of and twice of the thickness of the masks. It is preferred for the yoke to have a varying thickness, and it may have a similar shape to the masks in some examples. It should also be noted that the yoke need not extend across the entire surface of the magnets, and could just cover the magnets partially. Alternatively, the yoke may extend across the entire surface of the magnets and also around the sides of the magnets, optionally joining to the masks so that the magnet is fully encased aside from at the gap along the join line.

The yoke may have a generally rectangular shape extending across the width of the two magnets. Alternatively the yoke may have a rounded shape, for example with a flat surface confronting flat ends of the two magnets and a curved surface as the outer surface of the yoke. The curved surface may by defined by an arc such as an arc of a circle or a parabola for example. The curved or the rectangular yoke may be combined with masks of any shape. One preferred combination uses curved and embedded masks as well as curved yokes.

The magnet apparatus may comprise the two masks of the non-retentive material covering adjacent end surfaces of the two permanent magnets with the gap along the joining line between the two permanent magnets along with additional masks beside each of the two masks, the additional masks being further from the joining line and spaced apart from the two masks along the end surfaces of the permanent magnets. Thus, the original two masks form two central masks, with the additional masks spaced apart at either side of the two central masks and part of the end surfaces of the two permanent magnets exposed between the two central masks and the additional masks. There may be multiple additional masks all spaced apart from one another such that a sequence of masked and unmasked regions are created on the surface of the two permanent magnets, for example there may be six or more additional masks on each side. This arrangement results in a repeating increase and drop in the gradient of the magnetic field, with repeated peaks in the magnetic field, and the resulting arrangement has benefits in various fields, for example when separating particles, or when seeking to create a magnetic bearing.

The additional masks may be embedded within the two permanent magnets and/or have a varying thickness. The additional masks may in some cases all have the same size and geometry. They may have a similar width to the two central masks. They may be embedded with a similar depth to the two central masks, although different depths may also be used.

The material of the additional masks may be similar to the material of the two central masks, and thus may be a non-retentive material as described above. Alternatively, the additional masks may advantageously be made of a magnetically retentive material, for example a permanent magnet material, with the polarity of the magnet of the mask out of alignment with the polarity of the magnet that is being masked. The polarity of the magnet masks is out of alignment with the polarity of the permanent magnet to ensure that the magnetic field of the magnet masks can guide the magnetic field of the magnet apparatus to thereby affect field strength and/or that the magnetic field of the magnet masks opposes the magnetic field of the magnet apparatus in order to affect the gradient of the magnetic field. The polarity may be at least 10° out of alignment with the polarity of the main permanent magnets, for example 20° or more out of alignment and perhaps 45° or more.

In a preferred arrangement the magnet masks have their polarity in opposite orientation to the polarity of the main permanent magnets or within 20° of the opposite orientation, for example. This increases the gradient of the magnetic field. Thus, in the case where the main permanent magnet has its south pole at the masked end surface, then the additional mask(s) will have their south pole facing the end surface (optionally embedded in it) and their north pole facing in the same direction as the south pole of the masked permanent magnet. Where the additional masks comprise permanent magnet material then they may be of similar material to the main two permanent magnets, wherein the magnetic anisotropy of the magnets exceeds the magnetic induction of the material of the magnets.

Whilst the preferred embodiments depicted in the Figures of this application show generally rectangular magnets, the example implementations of the invention are not limited to this geometry and in some examples non-rectangular magnets may be used, such as magnets with a varying thickness and/or curved magnets. When the magnet has a varying thickness and/or a curve then the geometry of the masks (and the optional yoke) should be adapted accordingly. For example, if the magnets are used in a device with a tubular configuration then they may be formed as curved magnets forming parts of a circular circumference of a tube, or they may have a cross-section shaped as a sector or a segment of a circle. The curvature or varying thickness of the magnets may also be in two axes, for example to form a sector or a segment of a sphere or other solid.

The magnet apparatus may have just a single set of adjacent magnets and hence may consist of just two or more side-by-side magnets with masks as described above. Such an apparatus has utility in the separation of particles, for example. Multiple sets of magnets and masks might be placed in series with a flow of a working fluid, for example a fluid including particles for separation, flowing over the series of sets of magnets.

It is also possible to use two opposed sets of magnets, and in some preferred arrangements the magnet apparatus therefore includes a first set of magnets, with masks, as well as a second set of magnets, with masks, the first set of magnets and the second set of magnets facing each other with the two gaps parallel. This type of arrangement can provide enhanced separation of materials in some cases, which could use magnets oriented so that the magnetic fields of the two sets of magnets that repel each other or magnets oriented so that the magnetic fields attract one another. There may be further sets of magnets included, for example by having repeated magnet apparatuses stacked on top of one another.

Non-parallel gaps can also have some benefit. For example if the two gaps are perpendicular then there will be areas where the magnetic fields of the two sets of magnets repel each other, and areas where the magnetic fields attract. This can be useful in some applications, for example when separating certain differing types of particles.

The two sets of magnets may be arranged for relative rotational movement about an axis extending along a normal to the joining line. Thus, the magnets may be able to rotate from an orientation where the magnetic fields repel, to an orientation where the magnetic fields attract.

This arrangement can also form the basis of a magnetic bearing, in which case the magnetic fields of the two sets of magnets should be arranged to repel one another in order to maintain separation between mechanical parts. In the case of a bearing there may be multiple groups of two opposed sets of magnets, for example arranged for rotating movement in a shaft, with the sets of magnets moving relative to one another along the line of the join between the magnets so that there is always a repulsive force.

When two opposed sets of magnets are used then the two sets of magnets should be facing each other such that the outer surfaces of the masks of each set of magnets face one another. Two similar sets of magnets may be used, with similar shape and size for the magnets and the masks in each set, thus allowing for a symmetrical combined field. The two sets of magnets may be arranged so that the gaps are aligned, or alternatively the gaps may be offset. An offset gap can increase the active area by making a larger area with the required magnetic field characteristics.

The orientation of the magnets need not be fixed relative to a working element, such as a container with particles to be separated. The magnet apparatus may include a rotating wheel allowing for the magnets and masks to be rotated in-plane. Thus, the magnets and masks may rotate about an axis that extends normal to the magnet end faces. Rotation and relative movement may generate an improved separation effect and/or allow for certain particles or other objects to be maneuvered from place to place. In the case of two pairs of magnets, it may be advantageous to rotate one pair relative to the other pair so that the gaps are turn from parallel with the magnetic fields repelling one another, to perpendicular, to parallel with the magnetic field attracting one another, to perpendicular, and back to the first parallel orientation. Again this can allow for particles or other objects to be maneuvered.

Rather than the use of yokes or other bases, the magnet pairs may have masks on both of the end faces, thus generating a double sided arrangement. This could be useful in a device that uses multiple stages, for example for multi-stage separation of particles, since the same magnets can be used for two stages of a separation process, i.e. a flow path can be first along one side of a pair of magnets, and then along the opposite side of the pair of magnets. Different mask designs may be used on the two sides of the magnets in order to generate different magnetic fields.

The magnetic apparatus discussed above can be for separation of particles, for example for separation of particles of differing types having different paramagnetic and/or diamagnetic properties. In a further aspect the invention hence extends to a particle separator comprising the magnet apparatus. The particle separator may further comprise a sample container or sample plate for holding the particles to be separated. The particles may be a mix of particles of different types within a fluid. The sample container or plate may be provided with a vibrator for vibration of the container or plate. This can aid separation of particles. The separator apparatus may be used in the production of clean and super pure substances and materials in electronics, metallurgy and chemistry, separation of biological subjects (red blood cells, "magnetic bacteria", etc.) in biology and medicine, removal of heavy metals and organic impurities from water and so on.

The magnet apparatus may be for use as a high-sensitivity magnetic separator for separation of different types of paramagnetic substances and materials from diamagnetic ones, for division of the paramagnetic substances and materials in terms of the magnitudes of their paramagnetic susceptibility, and also for division of the diamagnetic substances and materials in terms of the magnitudes of their diamagnetic susceptibility.

By non-retentive it is meant that the material of the masks (and also optionally the yoke) has substantially no retentivity for magnetic field such that the permanent magnetization for the material after a magnetic field is removed is substantially zero. A magnetically soft material may be used for the non-retentive material, for example soft iron or iron alloys can be used. Possible iron alloys include nickel iron alloys or silicon iron alloys. In some examples the mask (and optionally the yoke) comprises vanadium permendur or vandadium-cobalt-iron alloys of the type known as Supermendur.

The magnets may be made of Nd—Fe—B, Sm—Co, or Fe—Pt, for example.

Viewed from a second aspect, the invention provides a method of generating a high gradient and/or high strength magnetic field, comprising providing a magnet apparatus as discussed above in the first aspect and/or optional/preferred features thereof. The magnetic field may be used for various purposes. One preferred use is for separation of particles.

Thus, viewed from another aspect, the invention provides a method for separation of particles comprising: using a magnet apparatus as in the first aspect; and exposing the particles to be separated to the magnetic field generated by the magnet apparatus.

The magnet apparatus used in the method may have any or all of the features discussed above in relation to the first aspect. The method may further include agitating the particles, for example via vibration, in order to promote separation thereof. The method may use flow of a fluid with the particles past or around the magnet apparatus. The particles may be particles having differing paramagnetic and/or diamagnetic properties and hence the method may include the separation of paramagnetic substances from diamagnetic ones, and/or the division of paramagnetic substances depending on their paramagnetic susceptibility, and/or the division of diamagnetic substances depending on their diamagnetic susceptibility. The method may be used in the production of clean and super pure substances and materials in electronics, metallurgy and chemistry, separation of biological subjects (red blood cells, "magnetic bacteria", etc.) in biology and medicine, removal of heavy metals and organic impurities from water and so on. In some preferred examples the particles are nanoparticles.

Certain preferred embodiments of the invention will now be described by way of example only and with reference to the accompanying drawings, in which.

Figure 5:
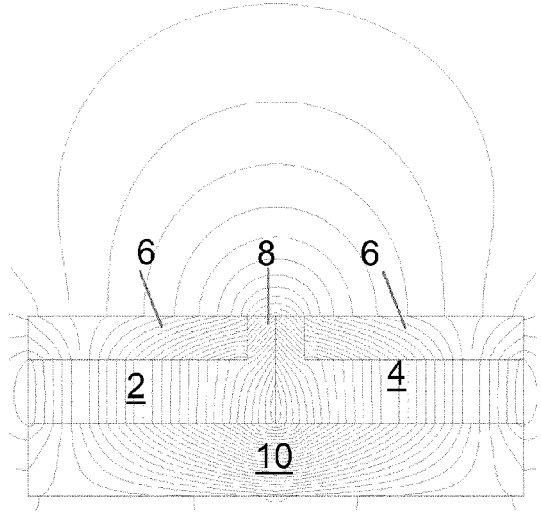
FIG. 5 illustrates magnetic field lines for a magnet apparatus with an embedded mask.
Figure 51:
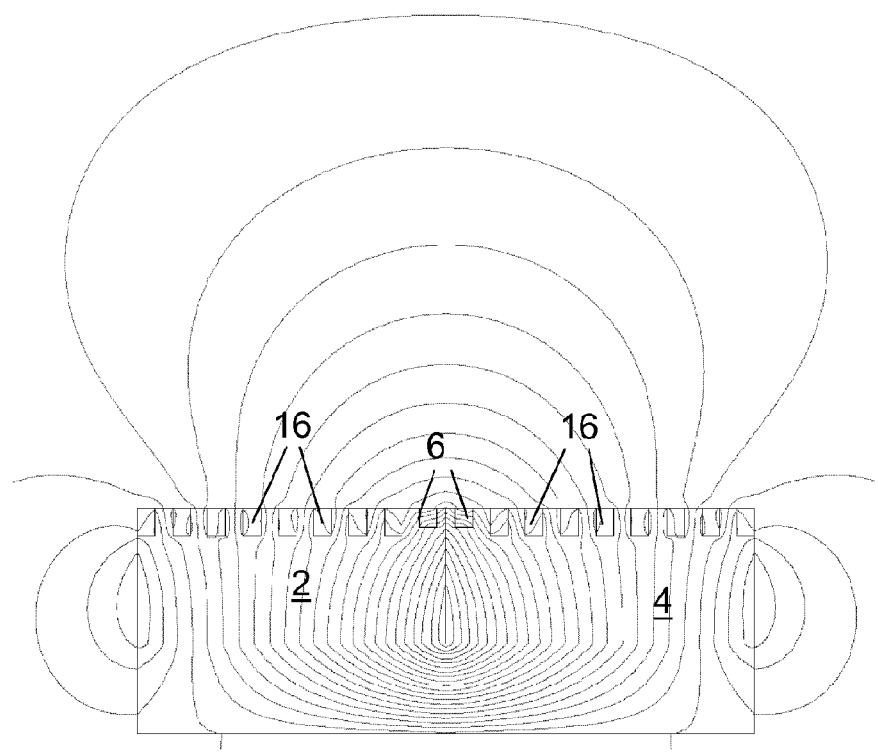
FIG. 51 shows simulated magnetic flux density for an example geometry where two central masks of non-retentive material are flanked by a sequence of additional masks made of permanent magnet material.
Figure 54:
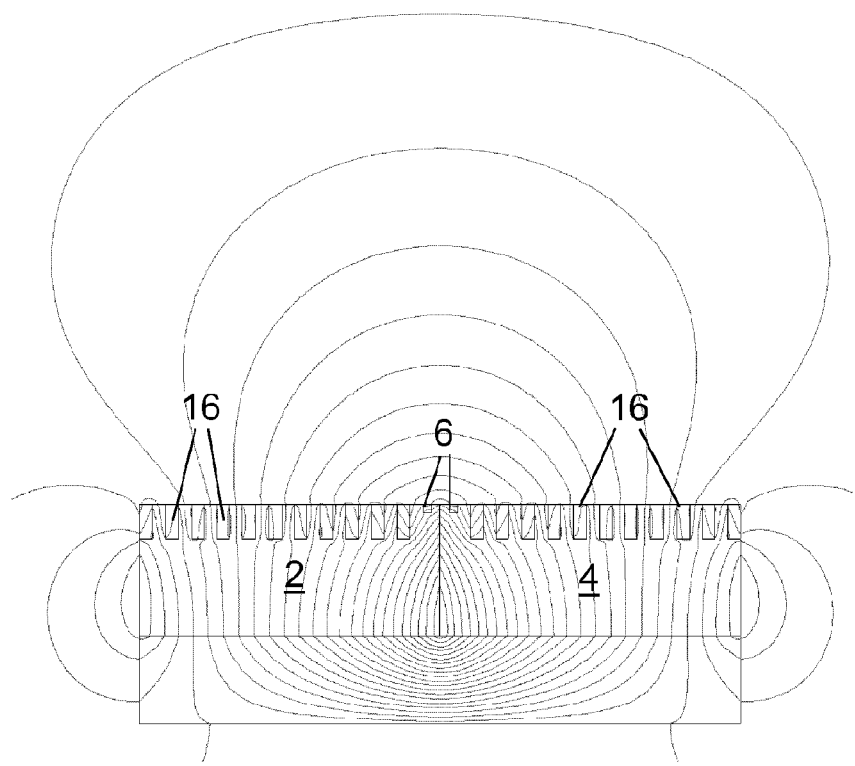
FIG. 54 shows simulated magnetic flux density for an example geometry where two central masks of non-retentive material are flanked by a sequence of additional masks made of permanent magnet material.
Figure 57:
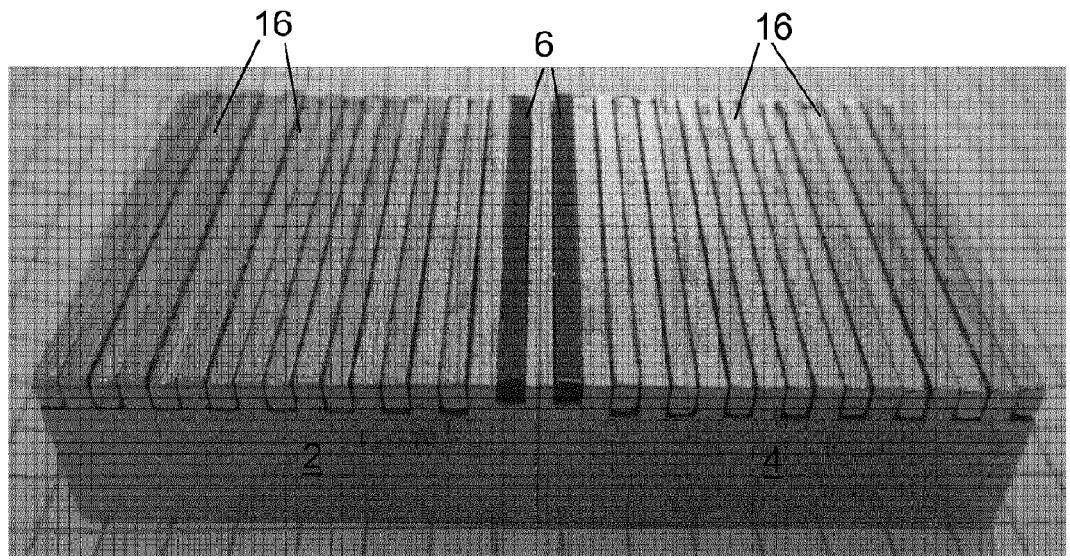
Figure 58:
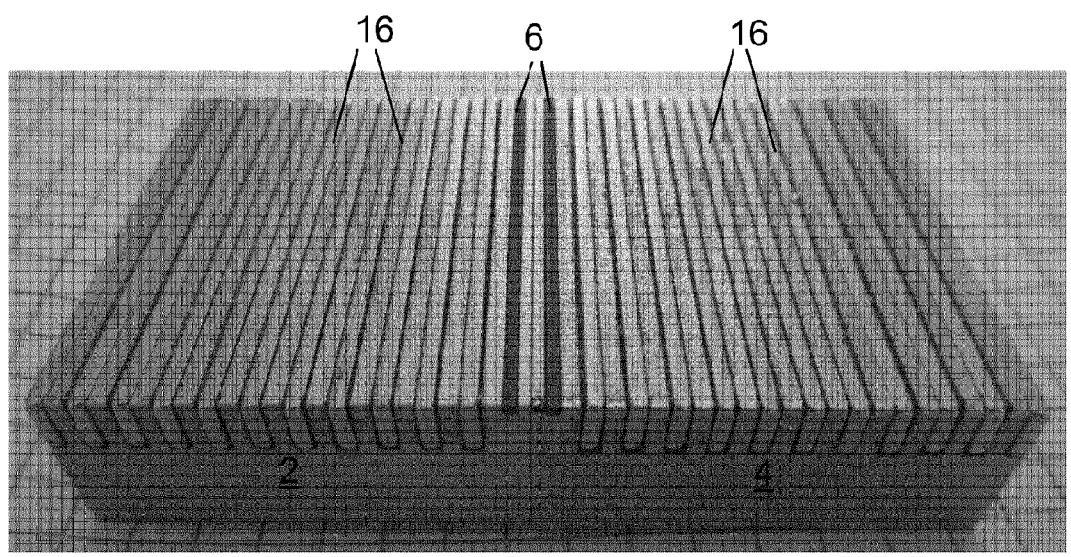
Figure 59:
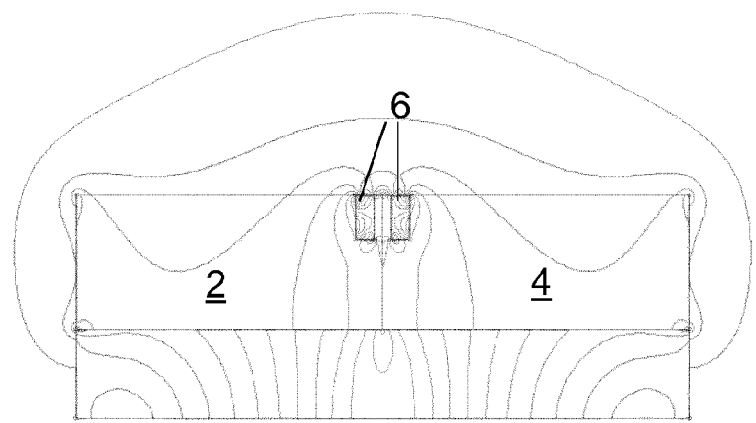
Figure 60:
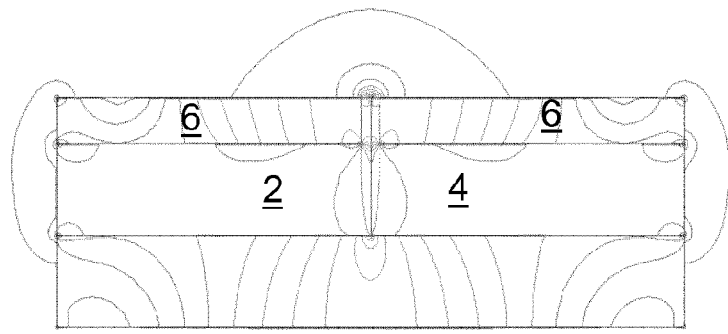
Figure 61:
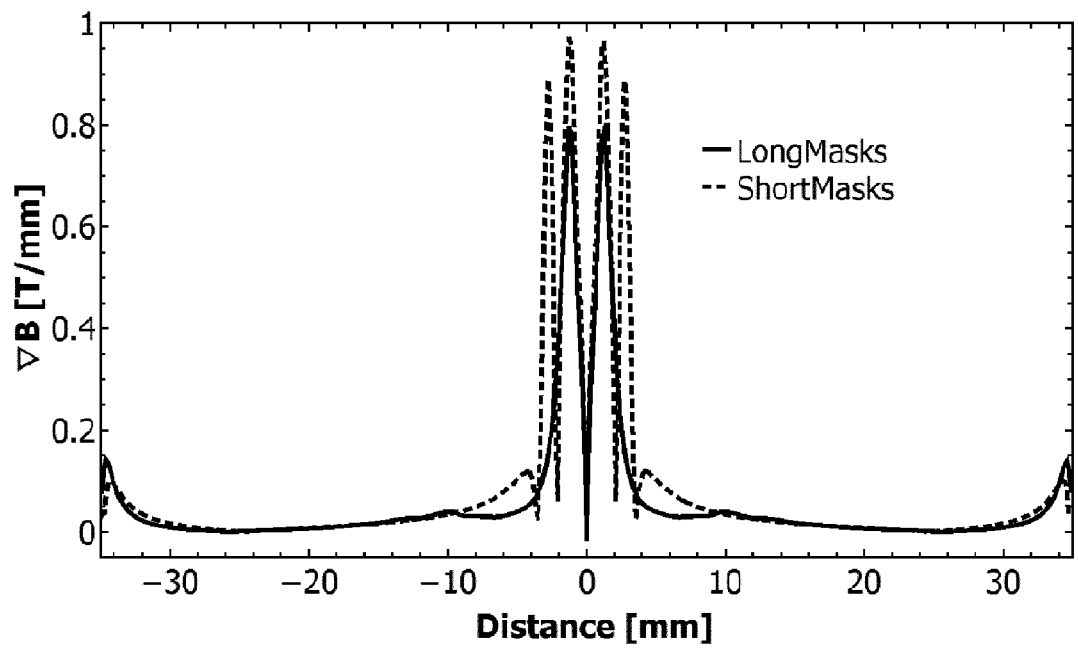
Figure 62:
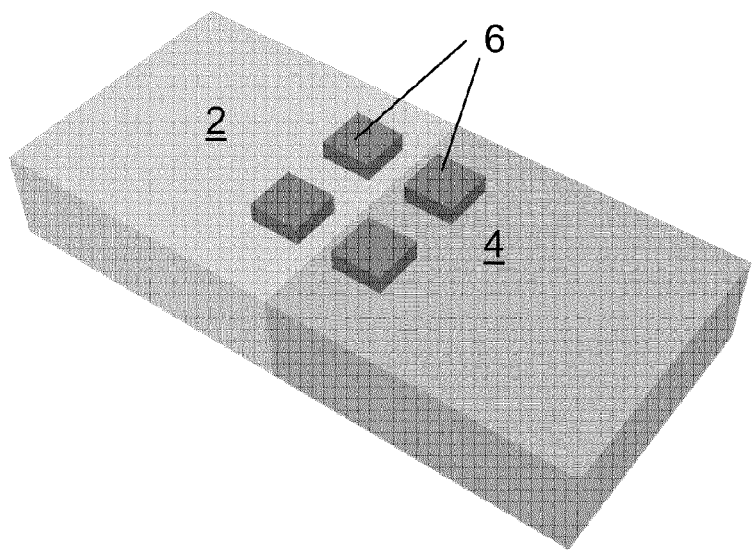

FIGS. 57 and 58 show prototype magnet arrangements similar to the simulated arrangements of FIGS. 51 and 54, aside from the omission of the non-retentive magnets FIG. 59 shows magnet field lines for another example geometry using two narrow central masks with 5 mm depth and no additional masks;

FIG. 60 shows magnet field lines for a geometry similar to that of FIG. 5;

FIG. 61 shows a comparision of magnetic field gradient for narrow masks 2 mm depth and full length masks as in FIG. 60;

FIG. 62 shows another example geometry using an array of disc shaped masks; and

Figure 63:
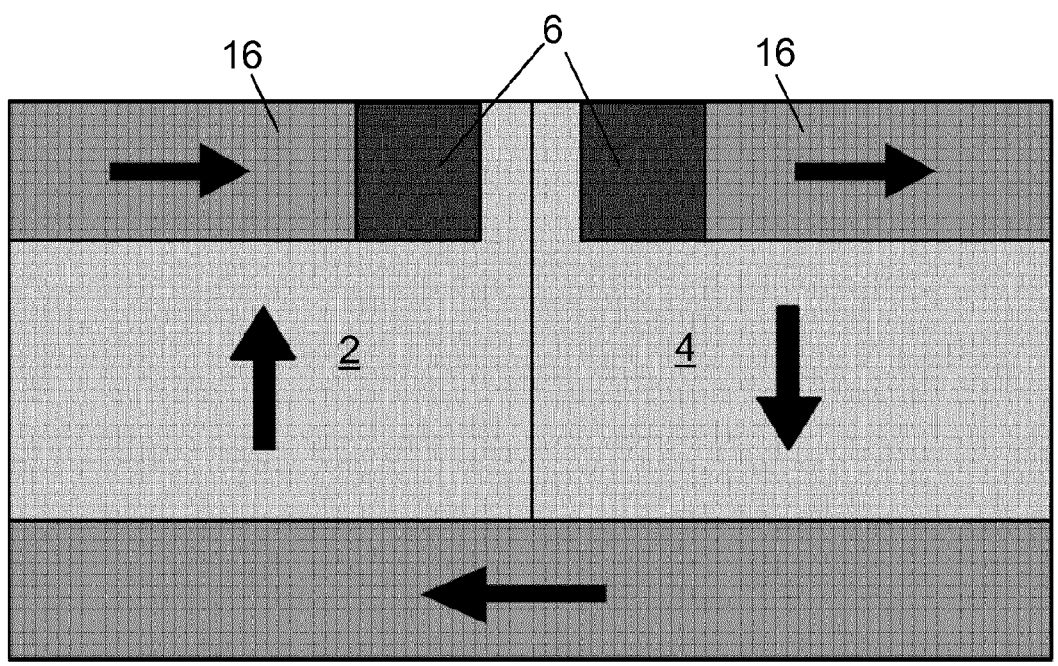

FIG. 63 shows a further example geometry using an array of square masks.

The magnet apparatus generates a high magnetic field gradient by means of two magnets and a shield/mask arrangement. This uses two permanent magnets with opposite polarisation in a Kittel open domain structure. The underlying principle is described below with reference to FIG. 1

The basic factor of magnetic separation is the magnetic force, which acts on a particle of the substance and which is proportional to the magnetic susceptibility of the substance, the value of the magnetic induction B and the value of the gradient $\nabla B$ of the applied magnetic field. Therefore, increasing the sensitivity and selectivity of magnetic separation will require use of the highest possible values of magnetic induction and magnetic field gradient, or their united factor—the product $B\nabla B$. This product $B\nabla B$ is a parameter relating to the sensitivity and selectivity of magnetic separation and it is not the repulsive force itself, which is a more complicated expression. It is advantageous to increase and also control the product $B\nabla B$ in order to achieve an improved magnetic bearing.

Figure 1:
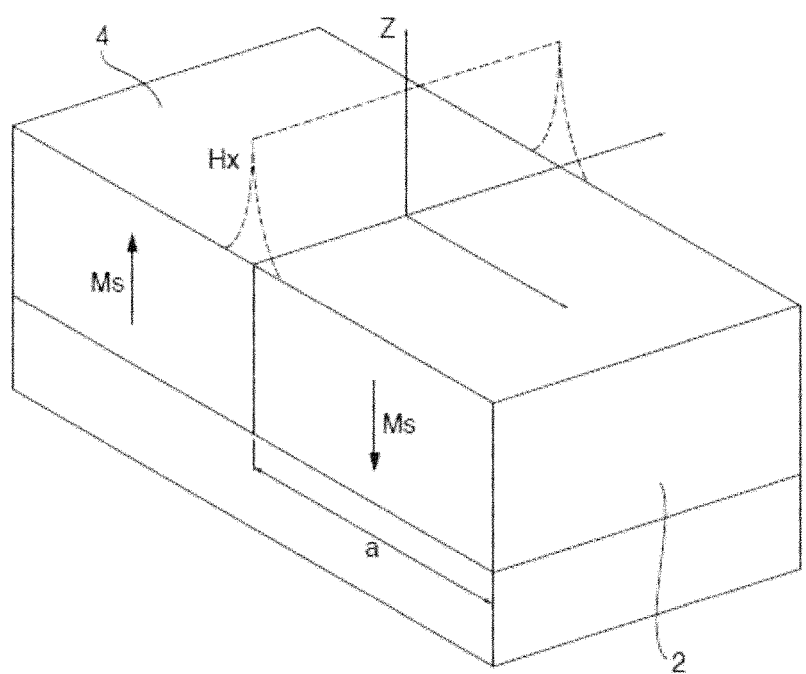
FIG. 1 is an illustration of the Kittel open domain structure of two side-by-side magnets.

FIG. 1 shows a magnetic system having two permanent magnets 2, 4 with opposite magnetization in the form of a Kittel open domain structure. In such a system, near the edges of the faces of the joining magnets, a strong magnetic stray field appears which is caused by the non-diagonal matrix elements of the demagnetization factor tensor, and the value of the product $B\nabla B$ may reach $10^{11}$ mT$^2$/m. On the surface of magnets, in the zone of the upper edges of the joining faces, a strong magnetic stray field appears with the components Hy(x,z), Hz(x,z) and Hx(x,z). The component Hy(x,z) is equal to zero due to the geometry of the system, the vertical component Hz(x,zk) comprises less than half the value of the induction of the magnet material, and the horizontal component Hx(x,z), which in the present case is of greatest interest, can be described by the expression:

$$Hx(x,z)=Ms[\ln(a^2+z^2+2ax+x^2)-2\ln(x^2+z^2)+\ln(a^2+z^2-2ax+x^2)]$$

where:
Ms is the magnetization saturation of the magnets, and a is the size of the magnet along the 0x axis (see FIG. 1).

It follows from this expression that on the plane z=0, at point 0 the horizontal component of the stray field strives into infinity. As a result, in a small area −0.1a×0.1a, along the line of the joining magnets the horizontal component of the magnetic stray field makes an abrupt jump, which is noted by a dashed line in FIG. 1, the intensity of which can be several times stronger than the induction of the magnet material.

The important practical feature of the magnetic system described is the fact that the stray field Hx(x,z) possesses a high gradient, which in the area near to the point 0 can reach values of $10^6$-$10^9$ mT/m. In this system the value of the product B∇B may reach $10^{11}$ mT$^2$/m. The disadvantage of this magnetic system is the impossibility of controlling the form and gradient of the created magnetic fields.

The preferred embodiments herein use a shield to address this and to considerably increase the magnitude of the product B∇B in the zone of separation and also regulate the product B∇B, which gives the practical possibility of using the high magnetic stray fields for the creation of a magnetic bearing.

Figure 2:
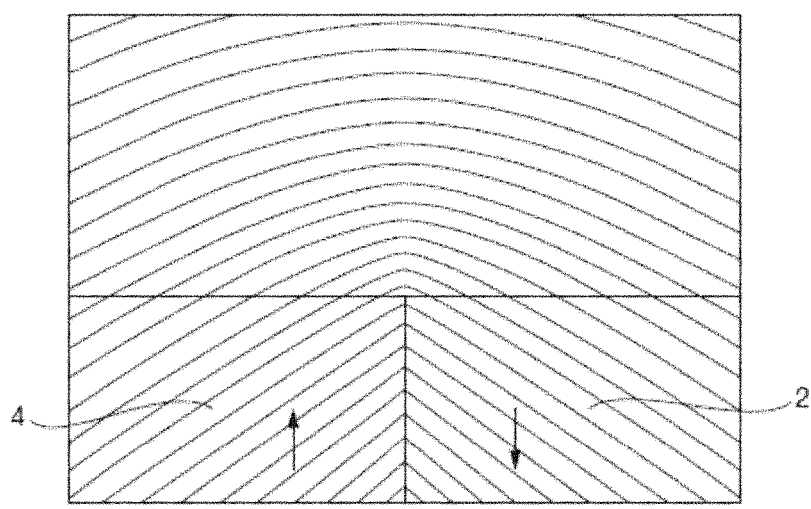
FIG. 2 is a diagram of magnetic field lines in the Kittel open domain structure.
Figure 3:
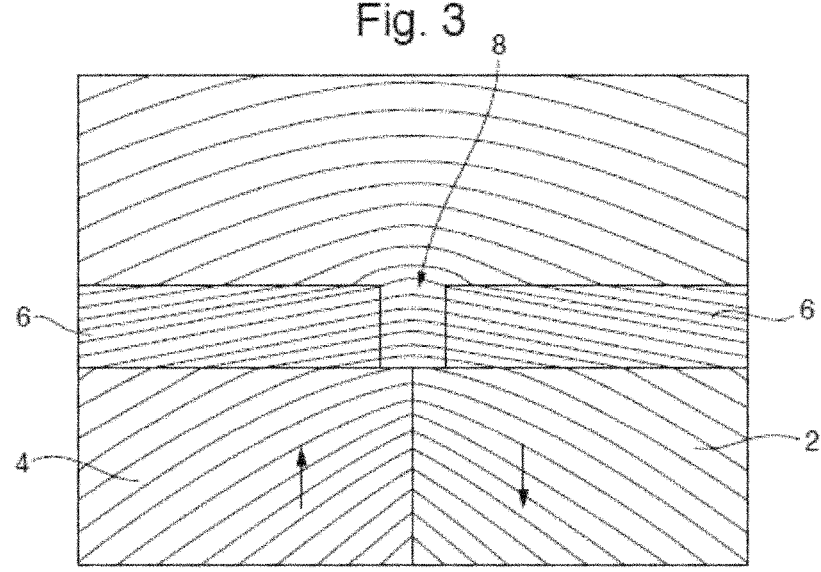
FIG. 3 is a close up of a prior art magnet assembly showing magnetic field lines at the gap between masks.

The illustrations in FIGS. 2 and 3 demonstrate the change in the magnetic field configuration compared to the known open domain structure that is achieved when a shield 6 is added atop the two magnets 2, 4, as in FIG. 3. With this magnetic system there is a concentration of the magnetic field in the zone formed by the gap 8 between the plates of the shield 6, and also a change in the shape of the magnetic field lines, as well as in the magnitude and distribution of the magnetic induction nearby the edges of the joined sides of the magnets. Thus, the use of the shield 6 as described herein makes it possible to change the parameters of the magnetic field considerably, and to create the most suitable conditions for repulsion of bearing surfaces, as in the magnetic bearings of the preferred embodiments.

Figure 4:
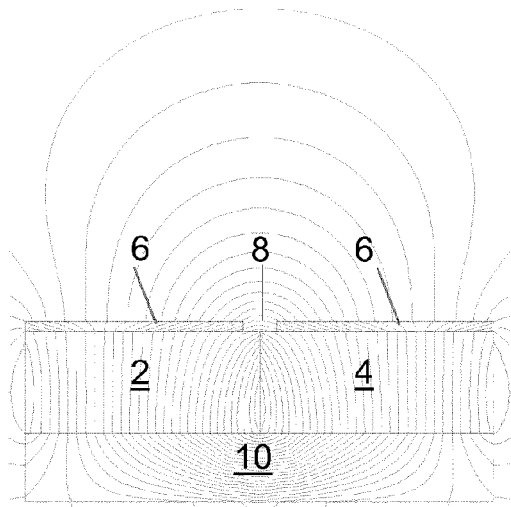
FIG. 4 shows magnetic field lines with a relatively thin mask, not in accordance with the claims.

FIGS. 4 through 7 show magnetic field lines for various possible mask designs. In these examples there are two magnets 2, 4 as in FIG. 3, with masks 6 either side of a gap 8 that is along the joining line between the two magnets 2, 4. The apparatus also makes use of an optional yoke 10 that acts as a base for the magnets 2, 4. The example in FIG. 4 is a comparative example that is not in accordance with the claims since it has a relatively thin mask 6 as shown, for example, in US 2010/0012591. The different mask designs were simulated in 2D simulation software PerMag 8 (Field Precision). The masks 6 were Vacoflux 48, as manufactured by VACUUMSCHMELZE GmbH & Co. KG of Germany. Other similar cobalt-iron alloys could be used, or other magnetically retentive alloys such as nickel iron alloys or silicon iron alloys. Similar materials can be used for the yoke 10. The magnetic field was measured in both the vertical and horizontal direction near the centre of the magnet apparatus as shown in FIGS. 8 to 19. It can be assumed that the magnetic fields in both directions will work together and both should therefore be considered when finding the optimal mask design. The force in the horizontal direction (parallel to the magnet surface) is expected to move the particles toward the centre of the magnets while the force in the vertical direction (perpendicular to the magnet surface) will drag the particles out of the samples toward the surface of the magnet. Both of these forces can have an effect when the magnet apparatus is used for separation of particles.

The dimension of the magnets 2, 4 in these examples were 7 cm×5 cm×1.5 cm. The sample was simulated as a sample container has walls of 1 mm so the diameter of the sample itself is 10 mm. The horizontal and vertical components of the magnetic field shown in the plots of FIGS. 8 to 19 are hence inside this sample volume with the sample placed at the centre of the magnet.

It is clear that the embedded masks 6, the curved masks 6 and the combination of the embedded and curved masks 6 provide improvements.

Figure 20:
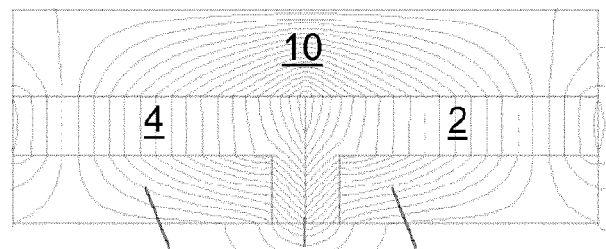
FIGS. 20 to 22 show magnet apparatuses with two magnet pairs as in FIGS. 5, 6 and 7.
Figure 21:
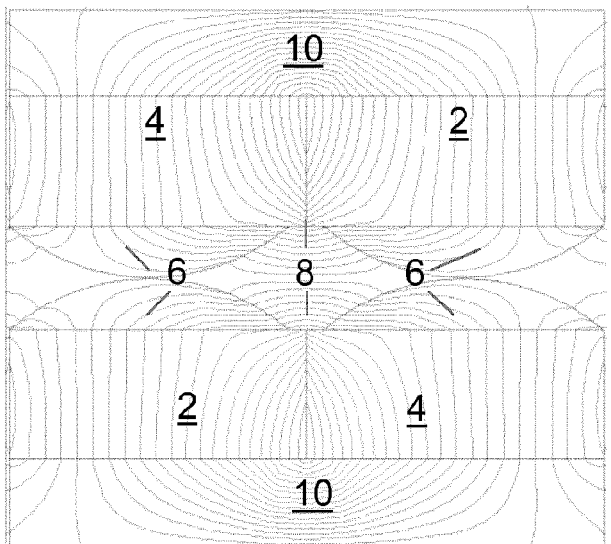
Figure 22:
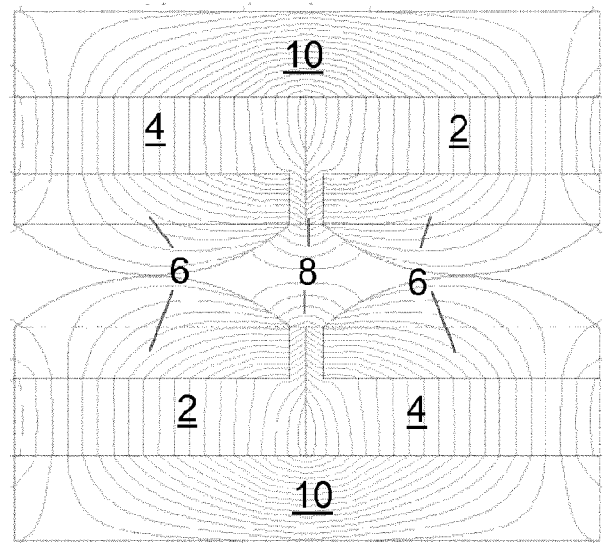
Figure 23:
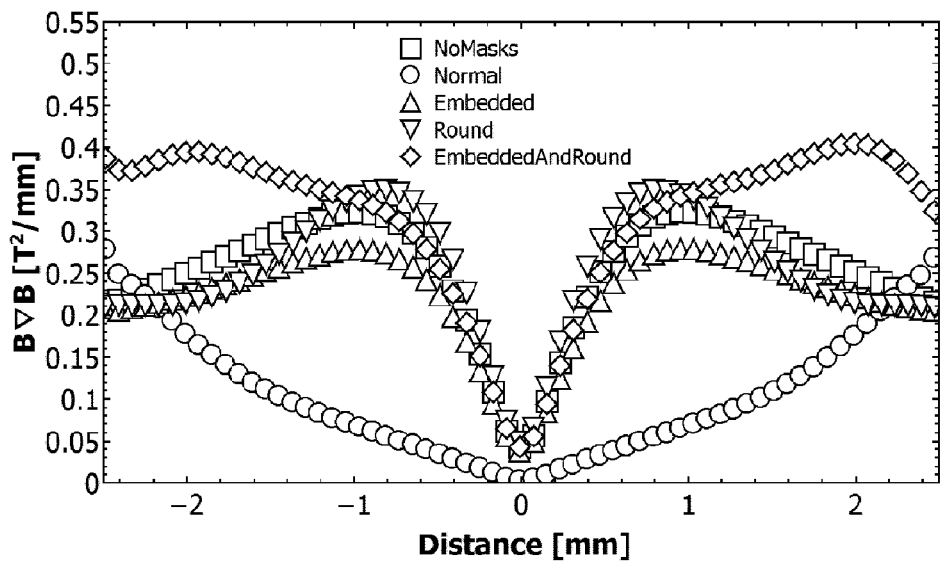
FIGS. 23 to 28 show plots of the product $B\nabla B$ in the horizontal direction (i.e. parallel to the magnet surface) along lines at 5 mm, 4 mm, 3 mm, 2 mm, 1 mm and 0 mm from the centre of the magnet apparatus for a double magnet pair with no mask, with a thin mask as in FIG. 4 and for the masked double magnet pairs of FIGS. 20 to 22.
Figure 24:
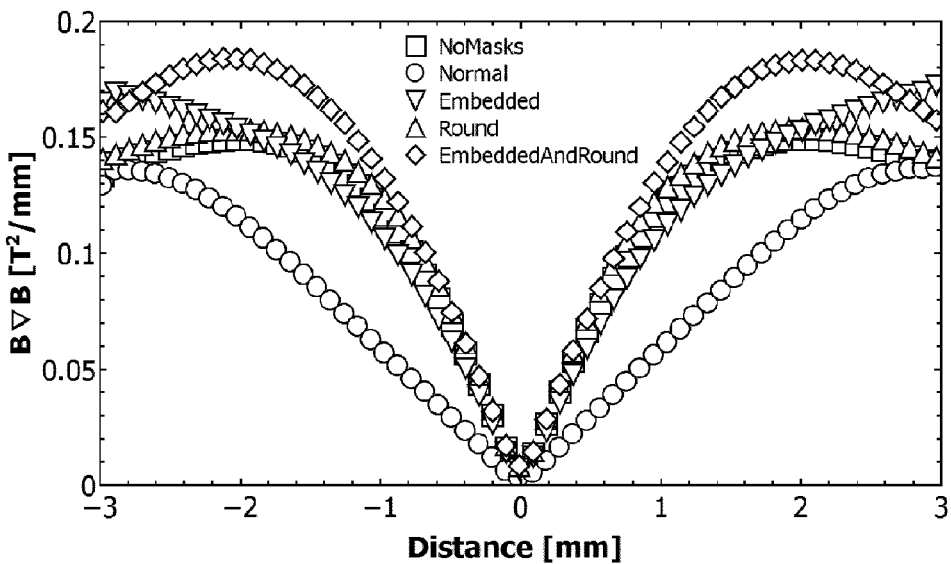
Figure 25:
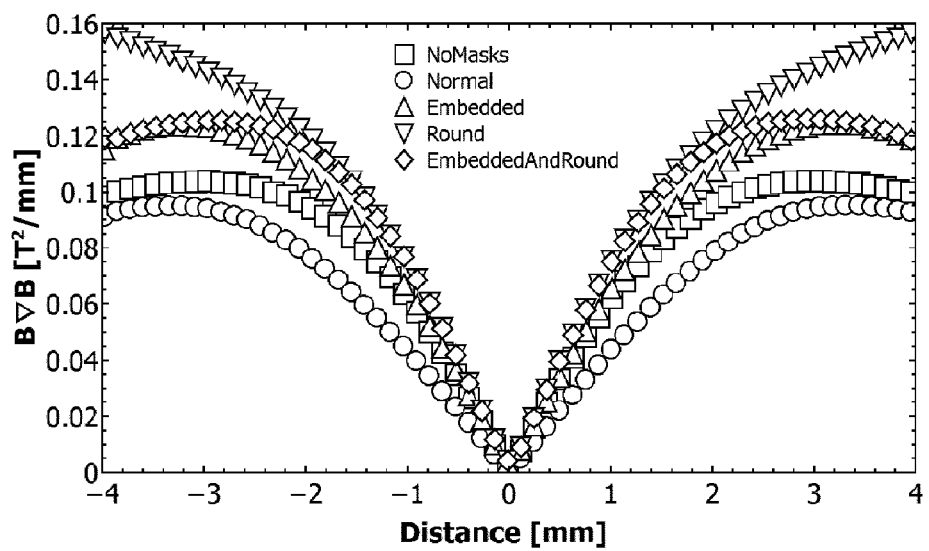
Figure 26:
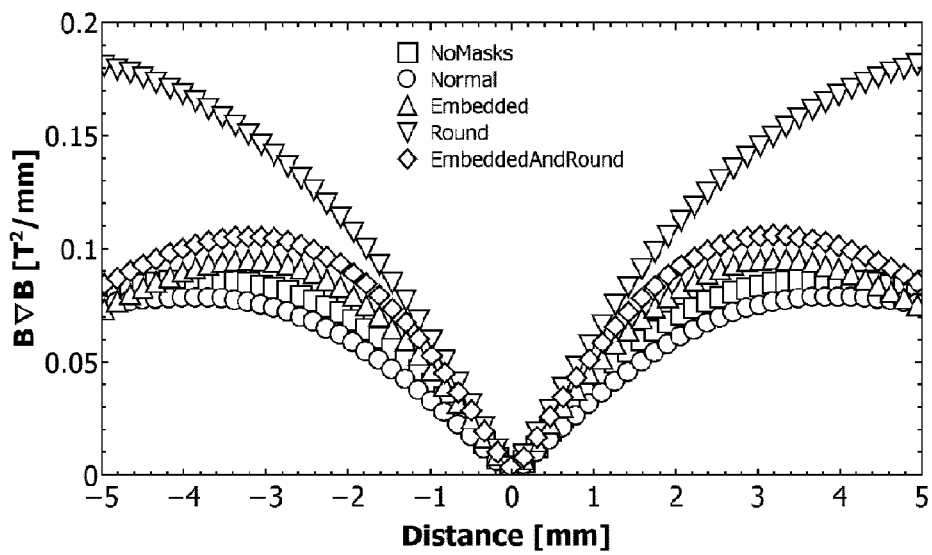
Figure 27:
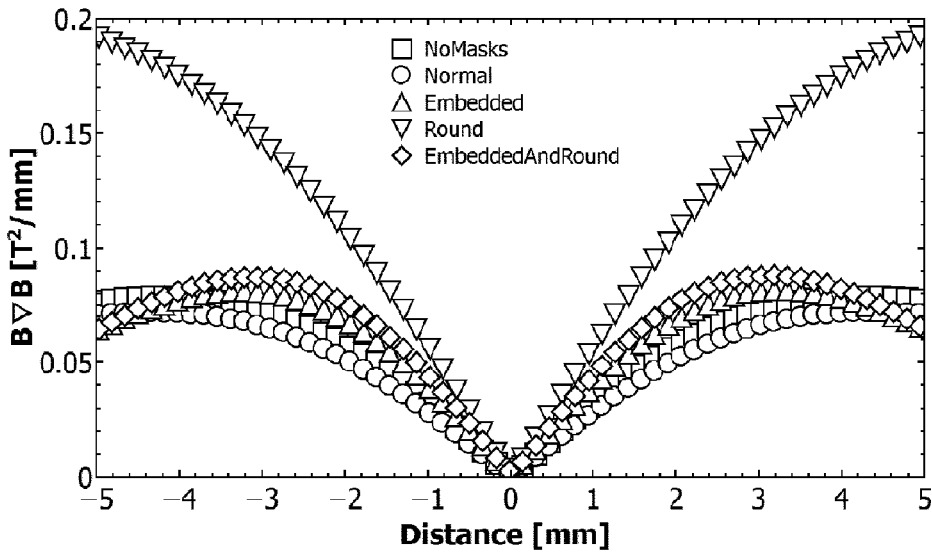
Figure 28:
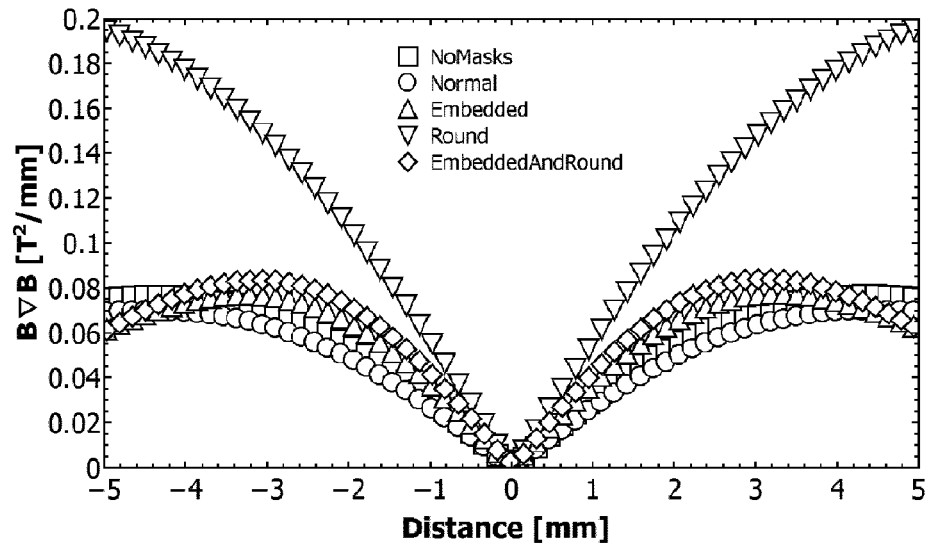
Figure 29:
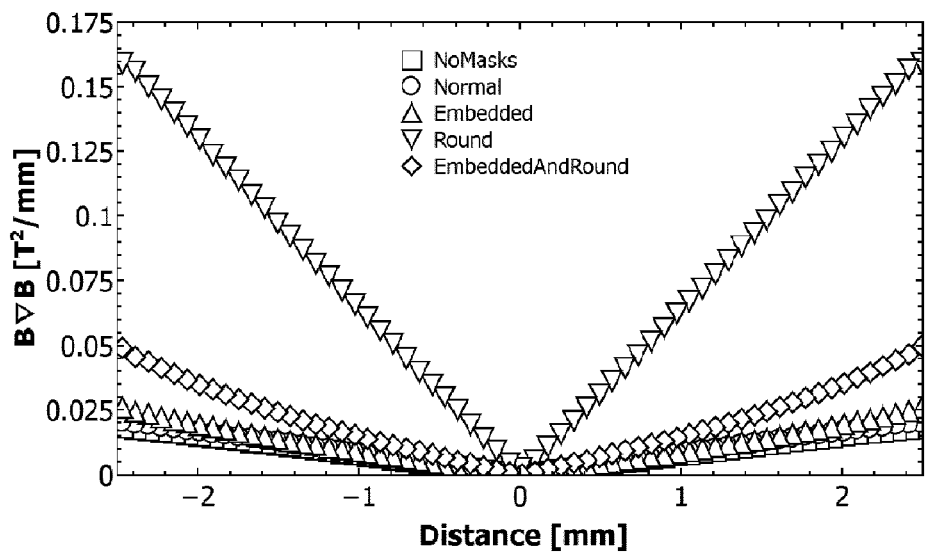
FIGS. 29 to 34 are plots of the product $B\nabla B$ in the vertical direction (i.e. perpendicular to the magnet surface) along lines at 5 mm, 4 mm, 3 mm, 2 mm, 1 mm and 0 mm from the centre of the magnet apparatus for a double magnet pair with no mask, with a thin mask as in FIG. 4 and for the masked double magnet pairs of FIGS. 20 to 22.
Figure 30:
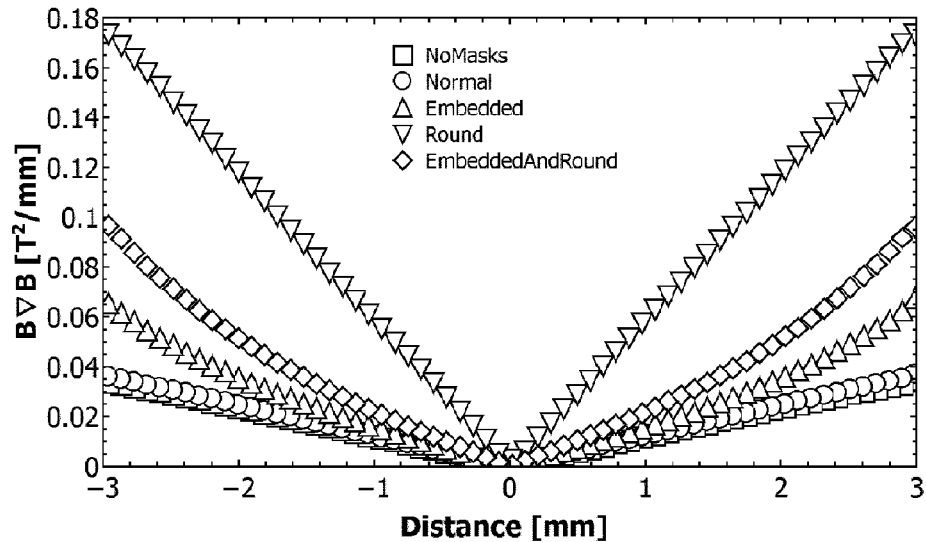
Figure 31:
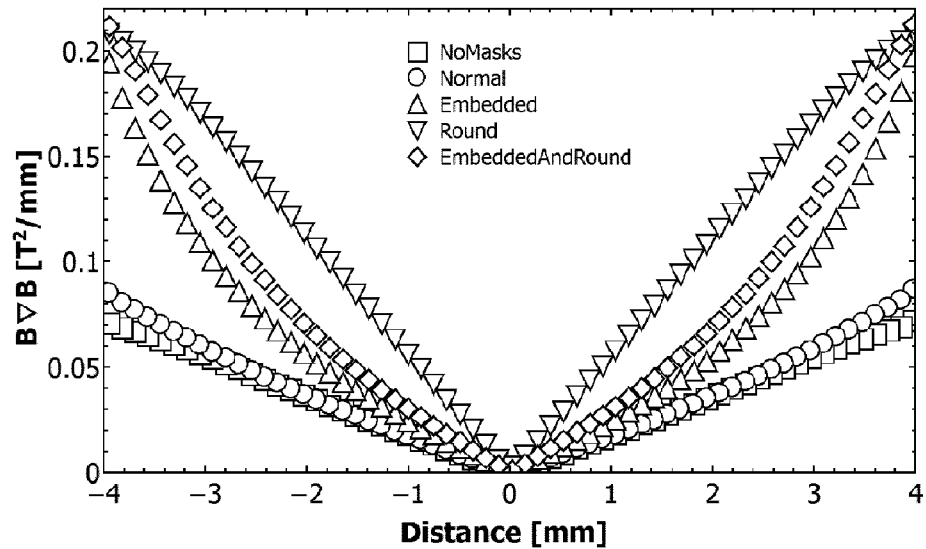
Figure 32:
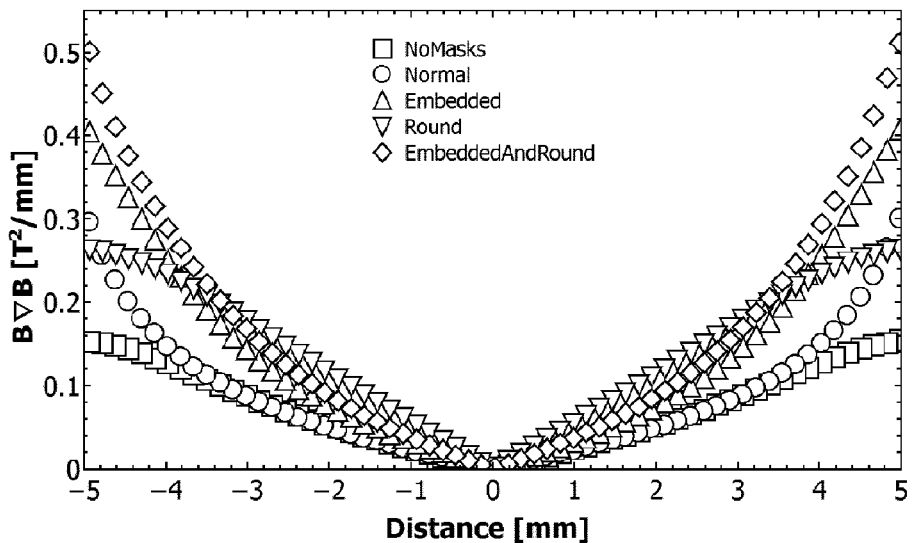
Figure 33:
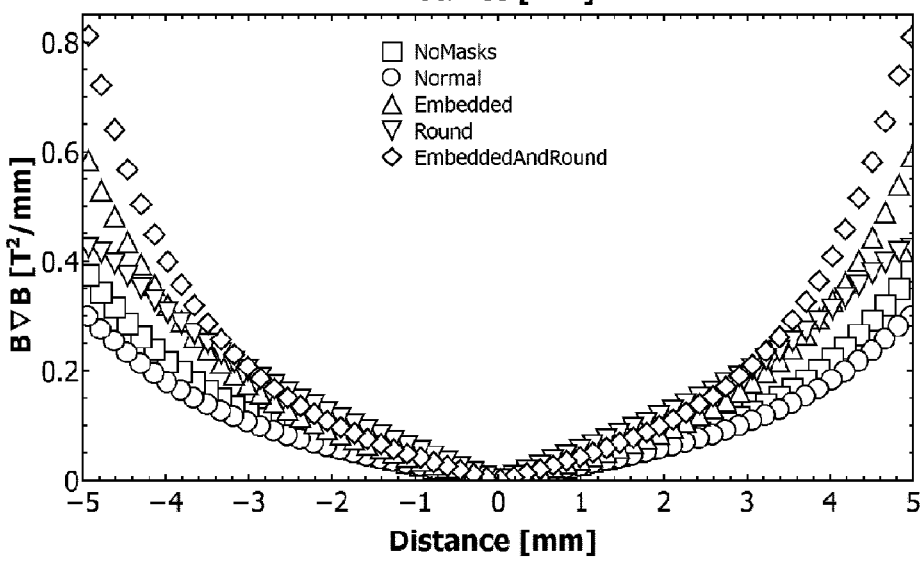
Figure 34:
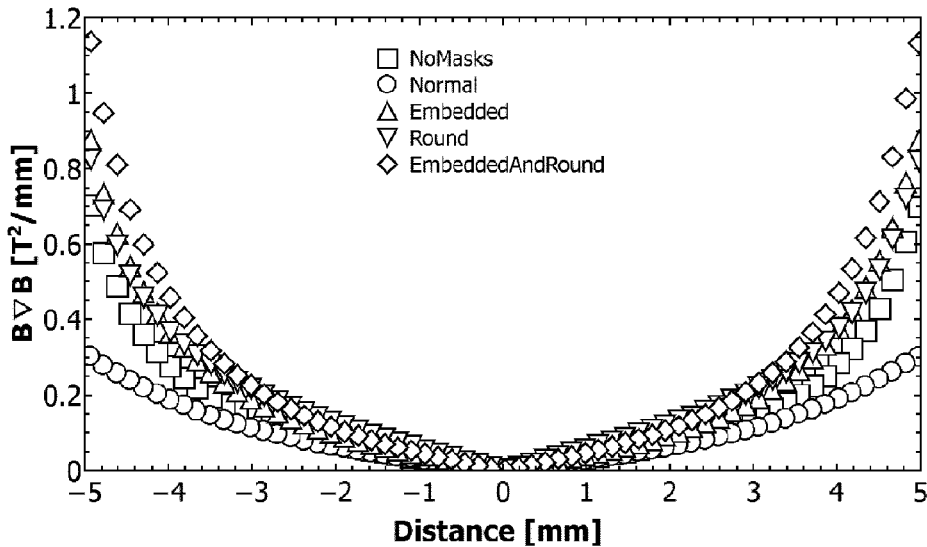

Similar designs for the masks 6 can be used with similar magnets 2, 4 in double pairs as shown in FIGS. 20 to 22. The embedded masks 6 need to be spaced apart so that there is space between the magnets for the active area, which will for example hold the sample container with particles for separation. The curved masks 6 can be placed in contact with one another with an active area provided due to the shape of the curves as seen in FIGS. 21 and 22.

FIGS. 23 to 34 show plots of the product B∇B allowing a comparison between the different mask designs (and no masks). Again it will be seen that there are potentially advantageous changes to the magnetic fields with the embedded and/or curved masks.

Figure 35:
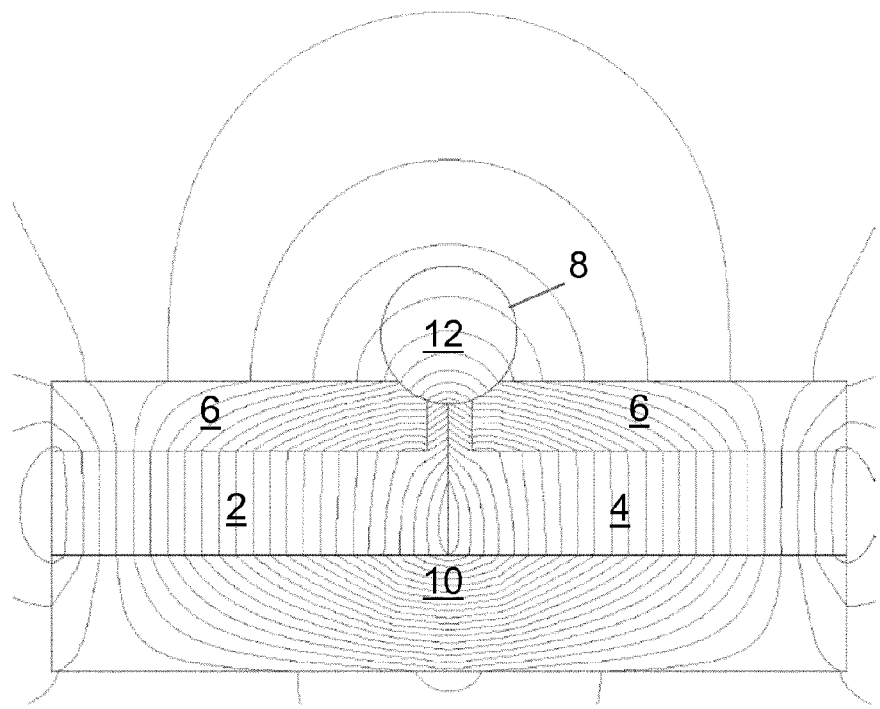
FIG. 35 shows magnetic field lines for a mask with a concave curved recess.
Figure 36:
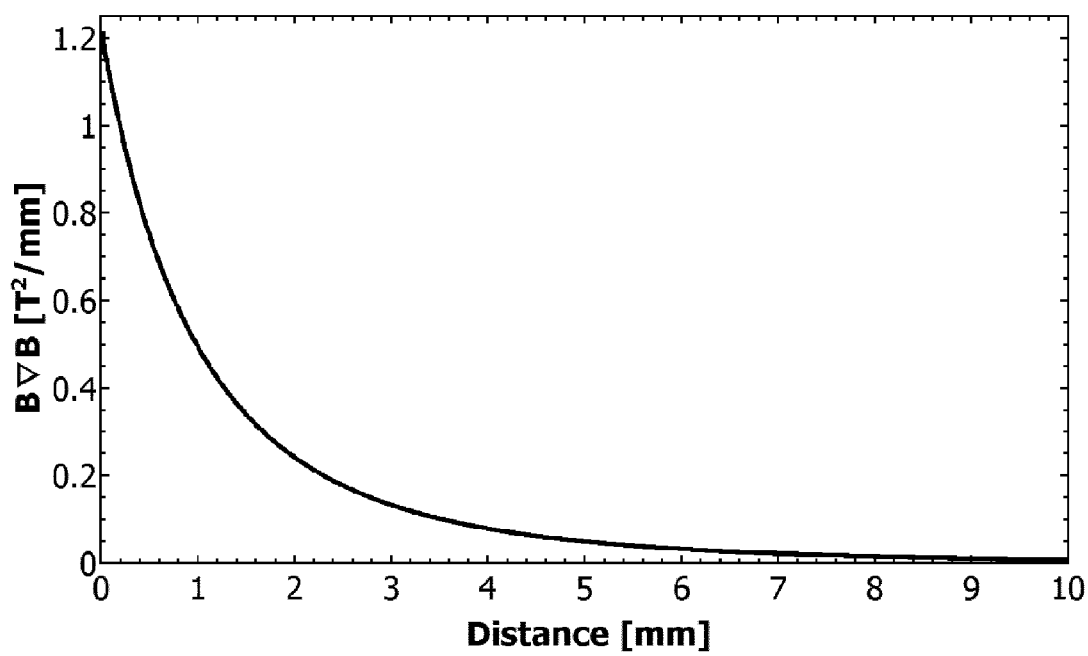
FIG. 36 is a plot of the product $B\nabla B$ in the vertical direction at the centre of the magnet apparatus of FIG. 35.
Figure 37:
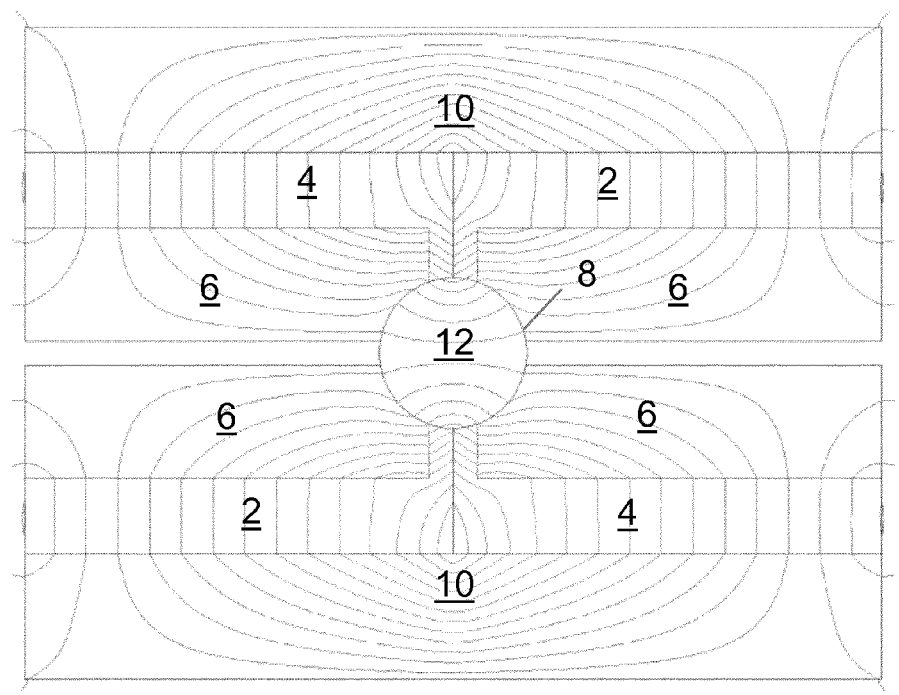
FIG. 37 shows a magnet apparatus with two magnet pairs as in FIG. 35.
Figure 38:
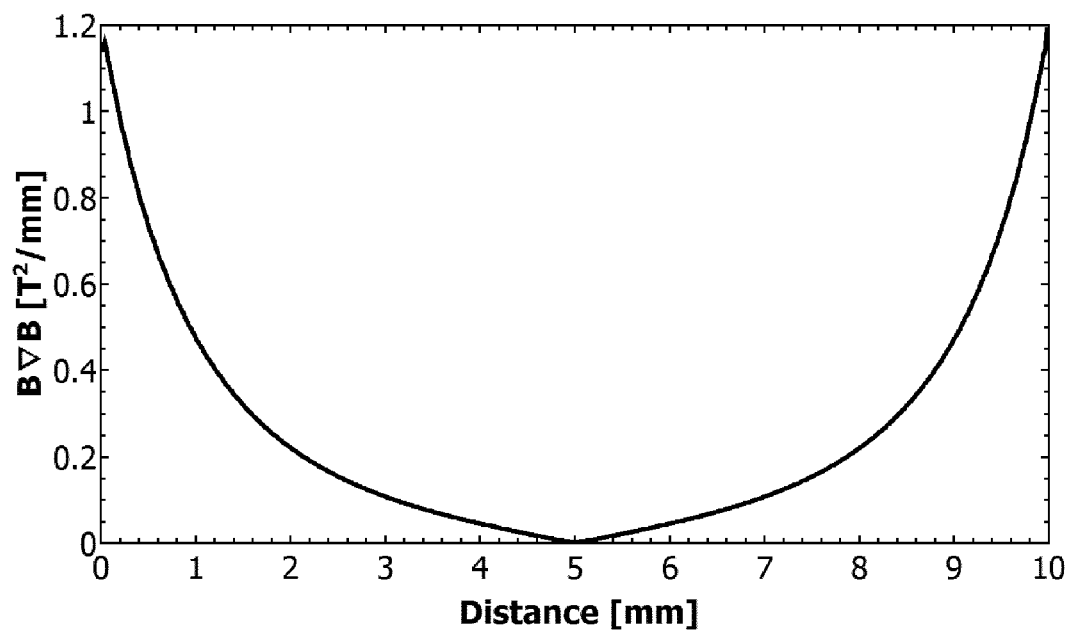
FIG. 38 is a plot of the product $B\nabla B$ in the vertical direction at the centre of the magnet apparatus of FIG. 37.

Another example arrangement is shown as a single pair in FIG. 35 and as a double pair in FIG. 37. Here the mask 6 has a curved element that forms a recess at the gap 8 for holding a sample container 12, which could be a cylindrical container 12 as shown in cross-section in the Figures. It is important to get the sample as close to the magnets 2, 4 as possible in order to get a big product of the magnetic field and gradient. One way to do this is a curved magnet 2, 4 that is tailor made to fit a specific sample container 12 as shown. This allows the sample to get close to the magnets 2, 4. FIGS. 36 and 38 show the product B∇B for the magnet devices of FIGS. 35 and 37. It will be seen that the product of the magnetic field and gradient is bigger for the single magnet design compared to other mask designs and the product for the double magnet is similar to other designs. A benefit with this concave curved design is that it allows for a more compact magnet design with a smaller total volume and less of the mask material, which is the most expensive part of the magnets.

Figure 39:
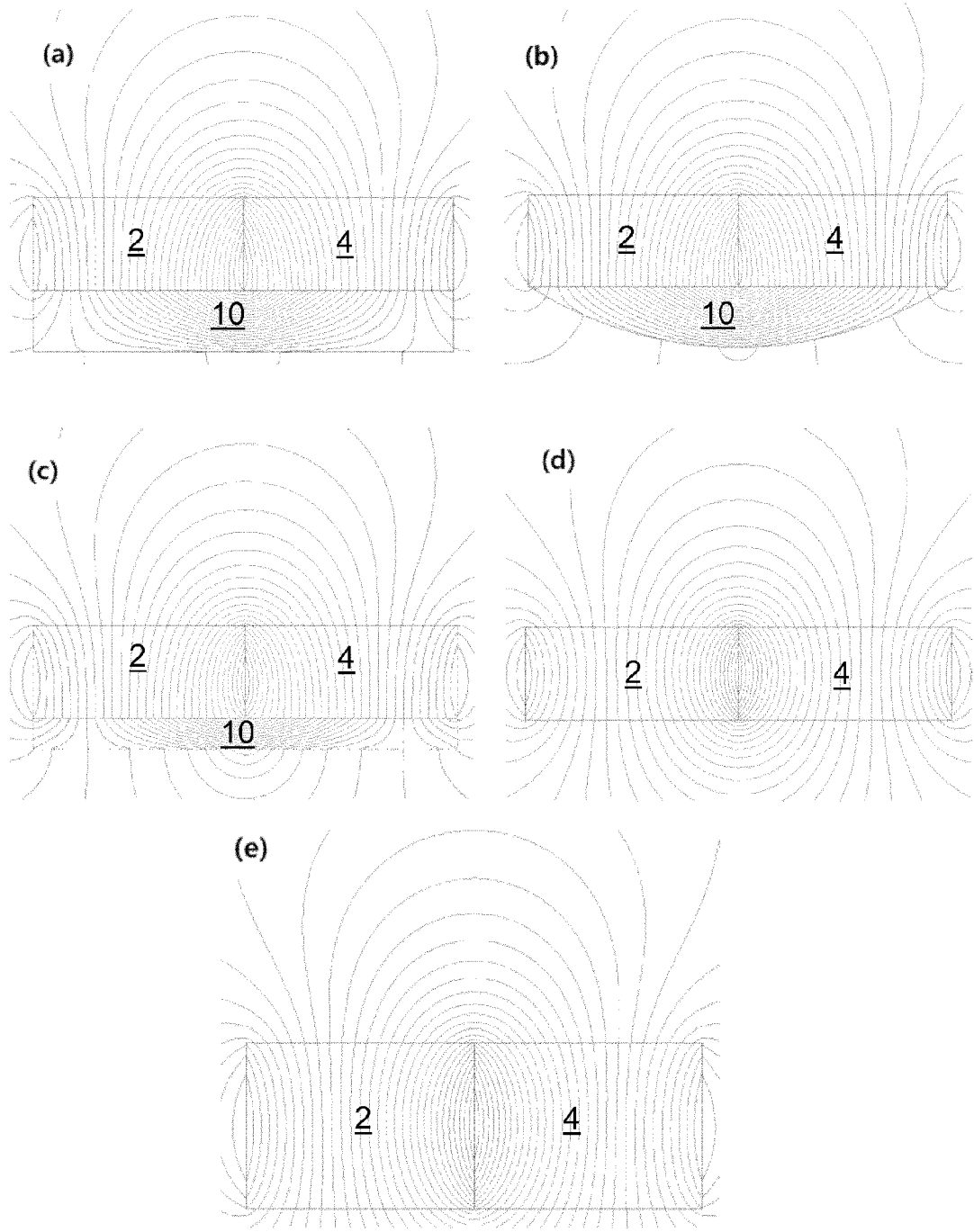
FIGS. 39a to 39e show alternative yoke designs (without masks) as well as the effect of changes in the size of the magnets.
Figure 40:
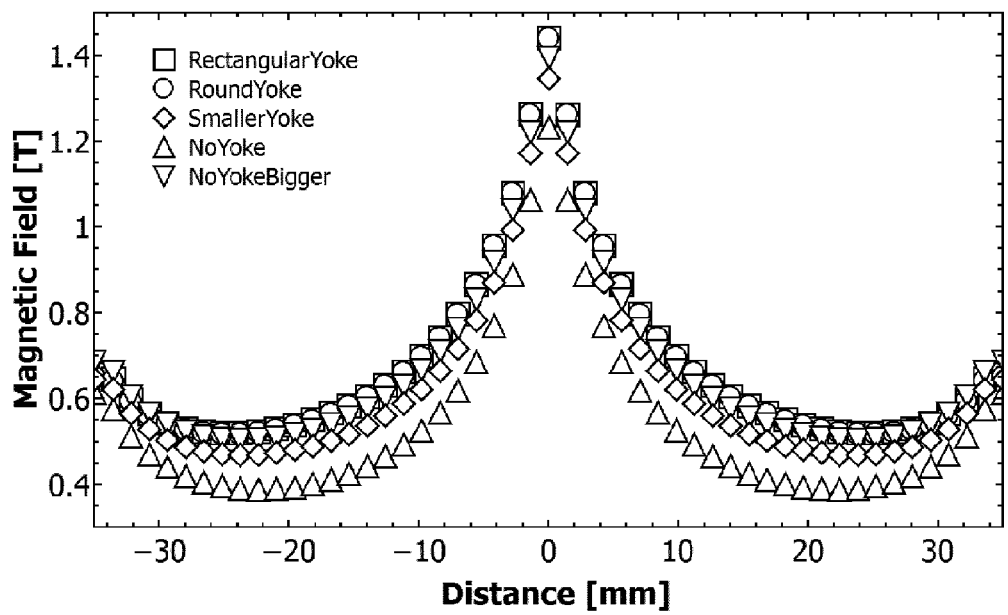
FIG. 40 shows the measured magnetic field in the horizontal direction 1 mm above the centres of the magnets of FIGS. 39a to 39e.
Figure 41:
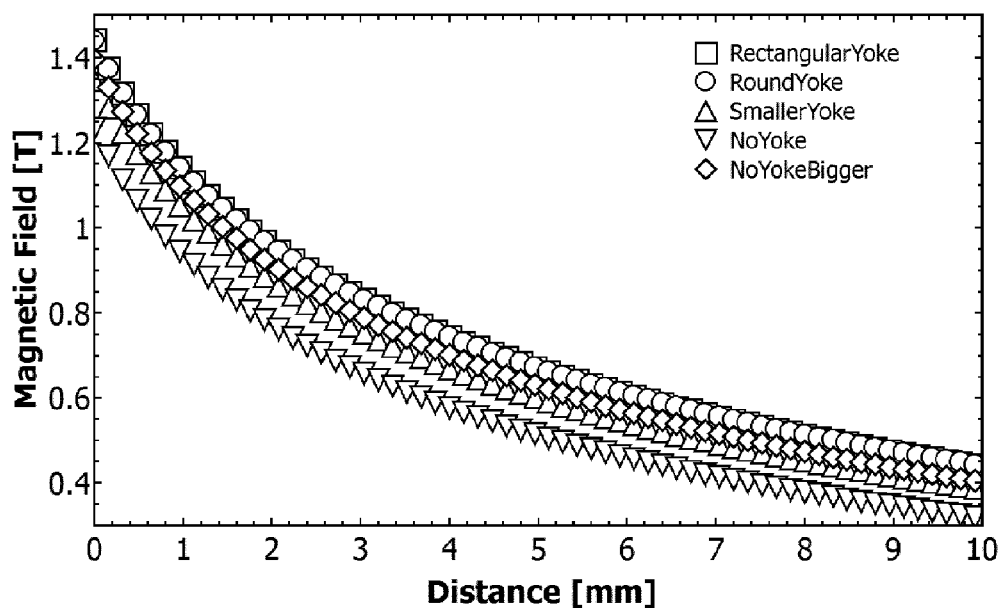
FIG. 41 shows the measured magnetic field in the vertical direction 1 mm above the centres of the magnets of FIGS. 39a to 39e.

The mask designs discussed above can be used in combination with a yoke 10 at the opposite end of the magnets 2, 4 and the yoke 10 can have varying designs. FIG. 39 shows (a) large rectangular yoke (b) curved yoke, (c) small rectangular yoke, (d) no yoke and small magnets and (e) no yoke and large magnets. FIG. 40 shows the measured magnetic field in the horizontal direction 1 mm above the centres of the magnets of FIGS. 39a to 39e and FIG. 41 shows the measured magnetic field in the vertical direction 1 mm above the centres of the magnets of FIGS. 39a to 39e. The simulations were done in a similar way to those above and the size of the magnets is also similar. It will be seen that the yoke 10 can provide some useful effects, although it is not crucial to include a yoke 10.

Figure 42:
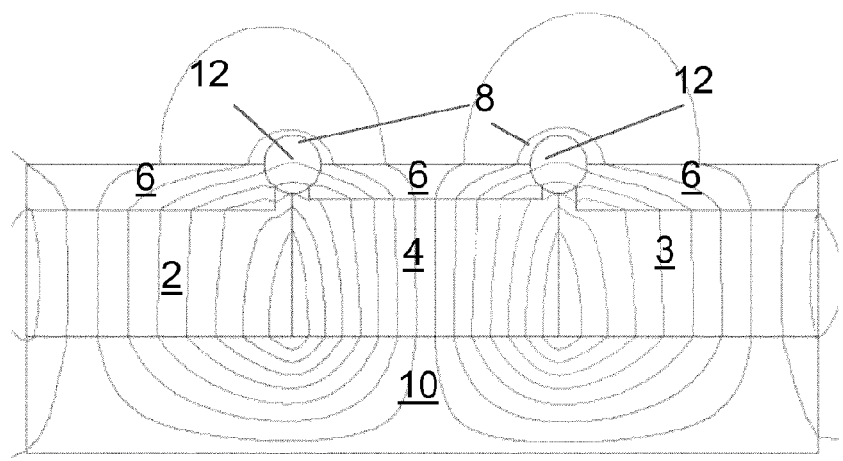
FIG. 42 is an example of a magnet apparatus with three magnets side-by-side.
Figure 43:
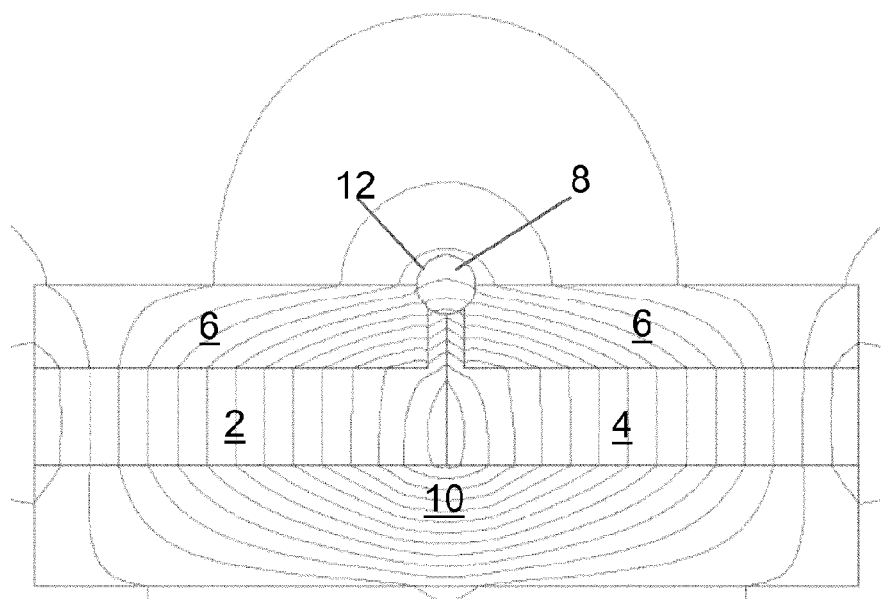
FIG. 43 shows a two-magnet arrangement with the same total volume as the FIG. 42 example.
Figure 44:
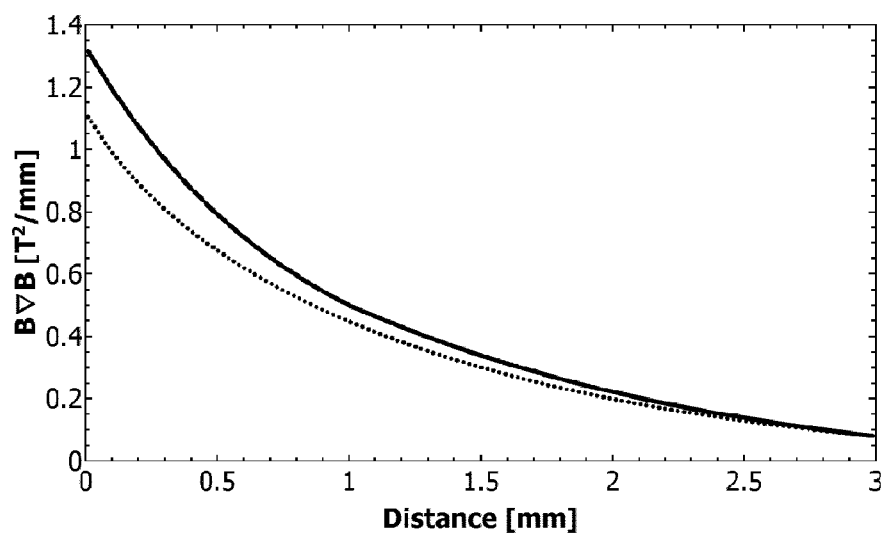
FIG. 44 is a graph comparing the calculated product of magnetic field and field gradient for the apparatus of FIG. 42 and the apparatus of FIG. 43.

The magnet apparatus is not limited to just a pair of magnets side-by-side. FIG. 42 shows an example of a magnet apparatus with three magnets side-by-side. In addition to the two magnets 2, 4 shown in the earlier Figures there is another magnet 3. This forms two gaps 8, which in this example are used to hold two sample containers 12. Further magnets could also be included and of course the mask and magnet geometry can vary, for example using the geometries shown in FIGS. 5 to 7 and optionally including yokes 10 as described above. The magnets 2, 3, 4 have polarities that are opposite for adjacent magnets 2, 3, 4. The use of additional magnets will, for the same total volume, have reduced magnetic force but this is balanced by the addition of a further 'peak' due to the additional gap. It has been found that to generate a roughly symmetrical field about each gap then the mask for the central magnet should be thinner than the other masks, as shown in the Figure. To allow for a comparison FIG. 43 shows a two-magnet arrangement with the same total volume as the FIG. 42 example. The calculated product of magnetic field and field gradient for the apparatus of FIG. 42 and the apparatus of FIG. 43 is shown in FIG. 44, which illustrates the lower field strength for the FIG. 42 apparatus. It will be understood that the use of more than two magnets is not limited to only the embedded masks as in the example of FIG. 42, but could also apply to curved masks and so on.

Figure 45:
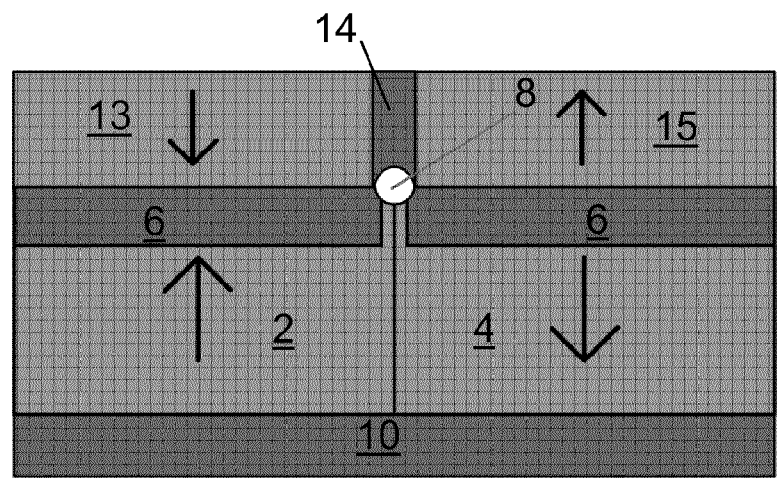
FIG. 45 illustrates the use of added magnets on top of the masks.
Figure 46:
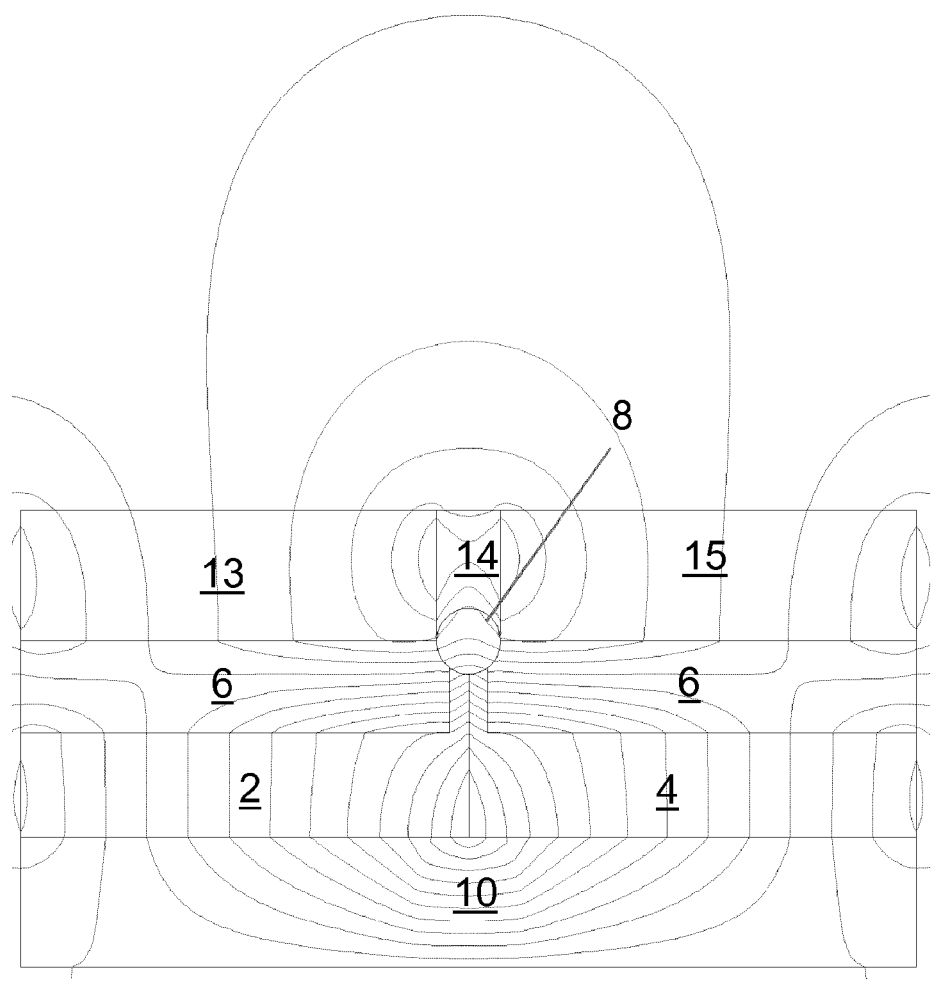
FIG. 46 shows field lines for the apparatus of FIG. 45.

Another adaptation involves the use of added magnets on top of the masks; and this is shown in FIG. 45. The main magnets 2, 4, the masks 6 and the yoke 10 in this example are similar to the example of FIG. 35 and form a space at the gap 8 that is suitable for holding a cylindrical sample container. Additional magnets 13, 15 are placed on top of the masks, and these magnets have opposite polarities to the underlying magnets 2, 4 as shown by the arrows. In between the two additional magnets 13, 15 there is a further masking element 14 that acts to fully enclose the cylindrical space formed at the gap 8. This may allow for further improvements in the magnetic field. FIG. 46 shows field lines for the apparatus of FIG. 45.

Figure 6:
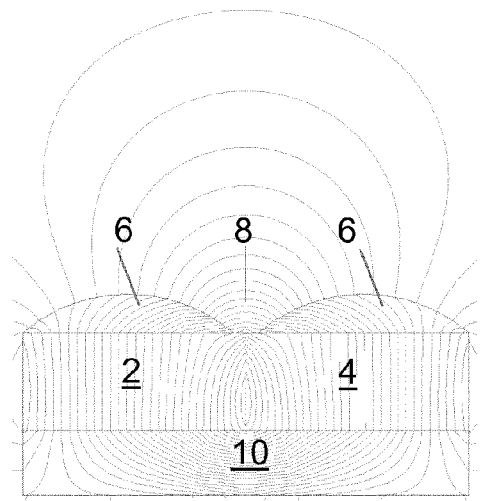
FIG. 6 shows magnetic field lines for a magnet apparatus with a curved mask.
Figure 7:
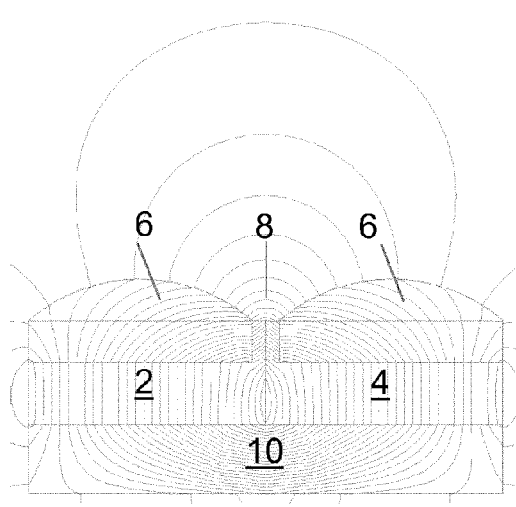
FIG. 7 shows the magnetic field lines for a magnet apparatus using both an embedded mask as in FIG. 5 and a curved mask as in FIG. 6.
Figure 8:
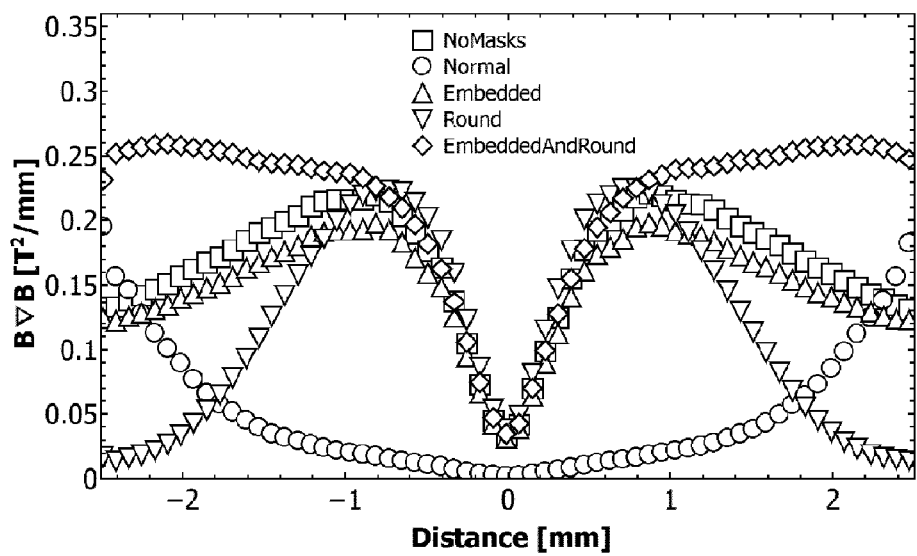
FIGS. 8 to 13 are plots of the product $B\nabla B$ in the horizontal direction (i.e. parallel to the magnet surface) along lines at 5 mm, 4 mm, 3 mm, 2 mm, 1 mm and 0 mm from the centre of the magnet apparatus for a magnet pair with no mask and for the masked magnet pairs of FIGS. 4 to 7.
Figure 9:
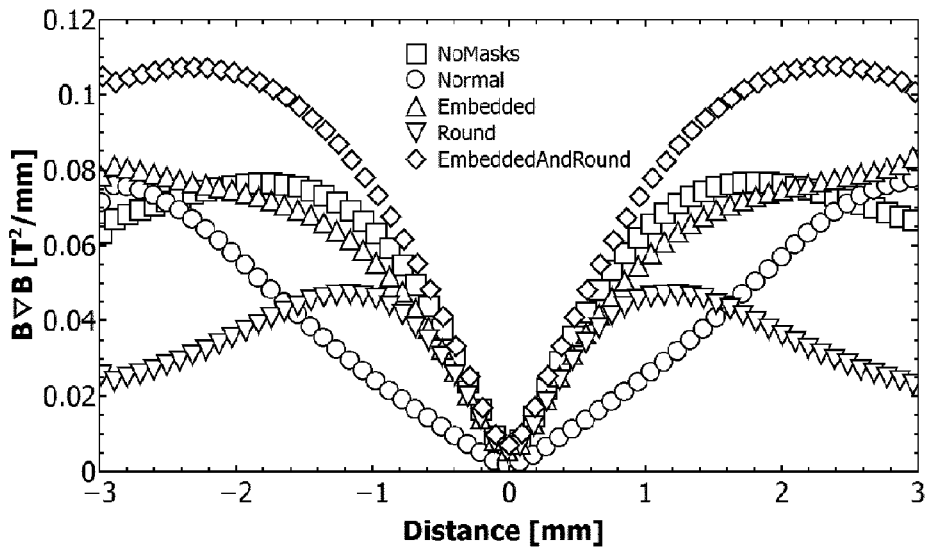
Figure 10:
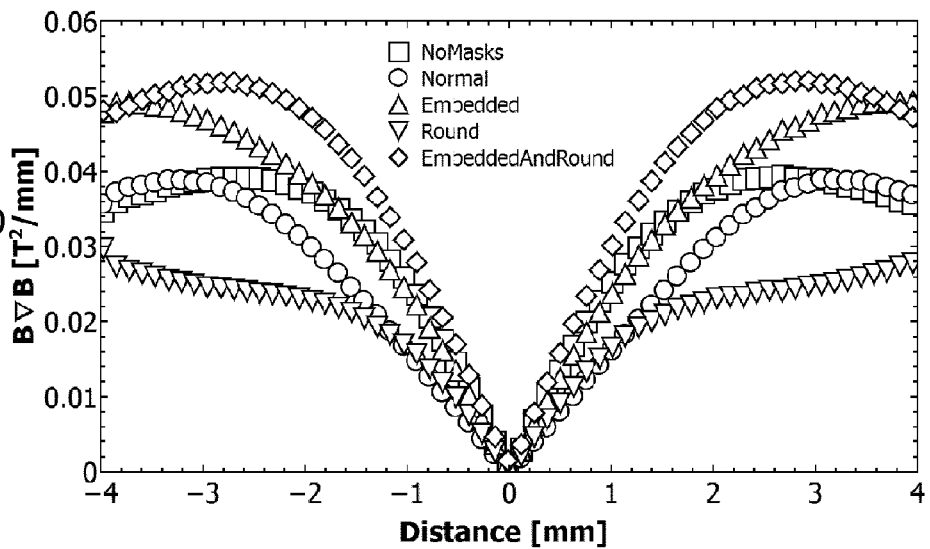
Figure 11:
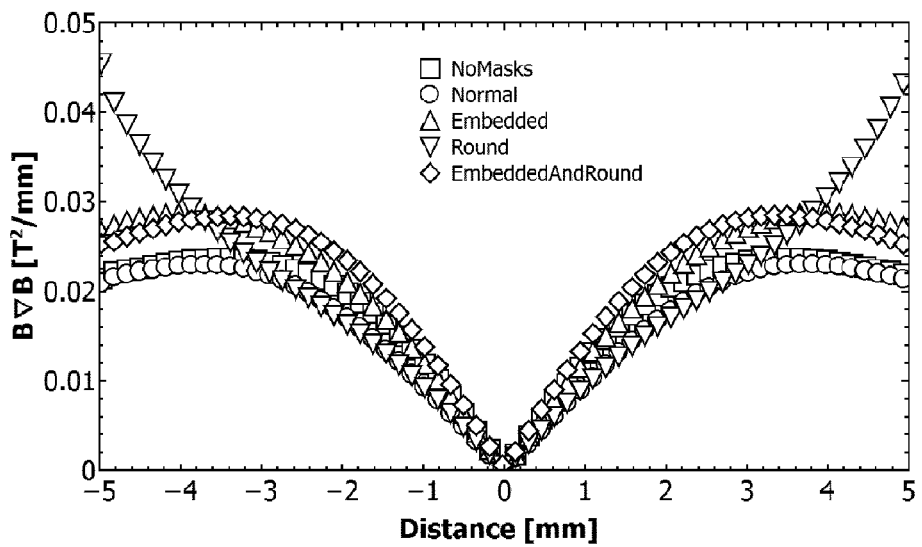
Figure 12:
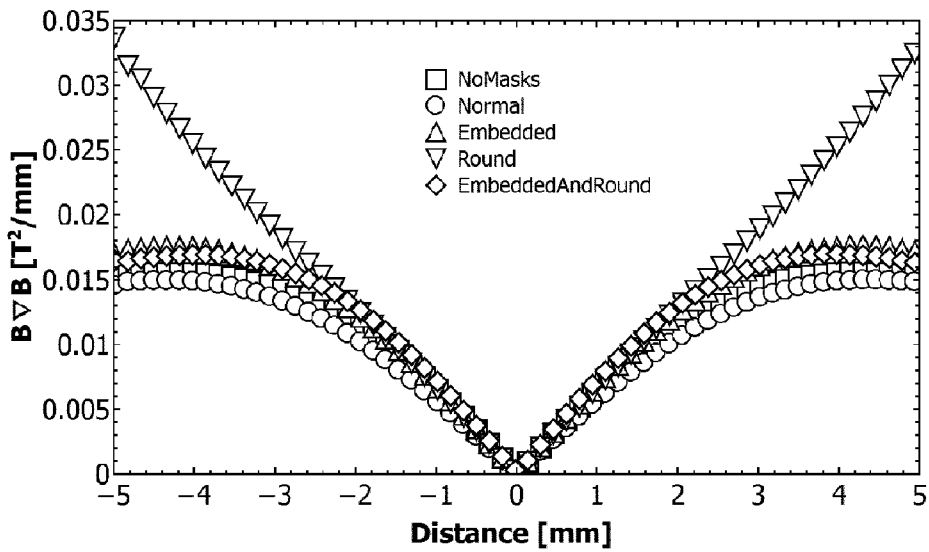
Figure 13:
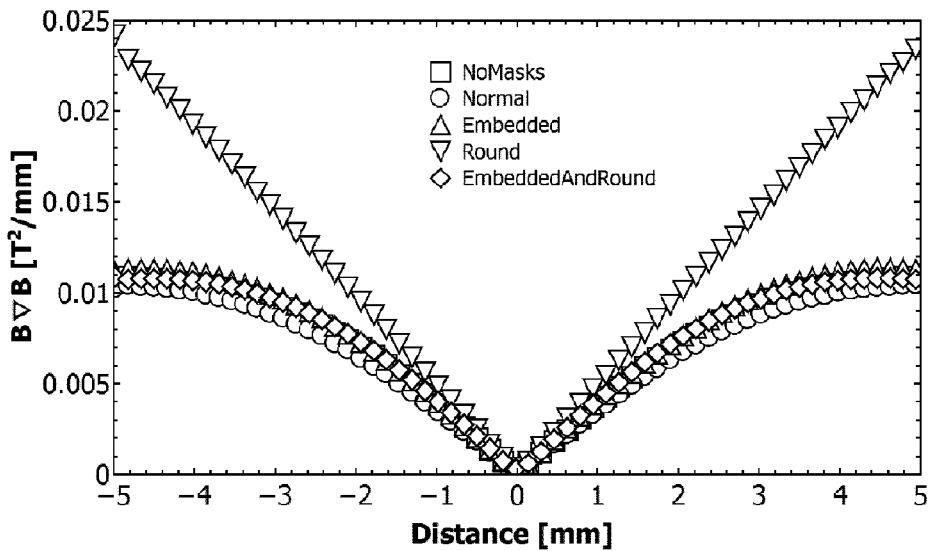
Figure 14:
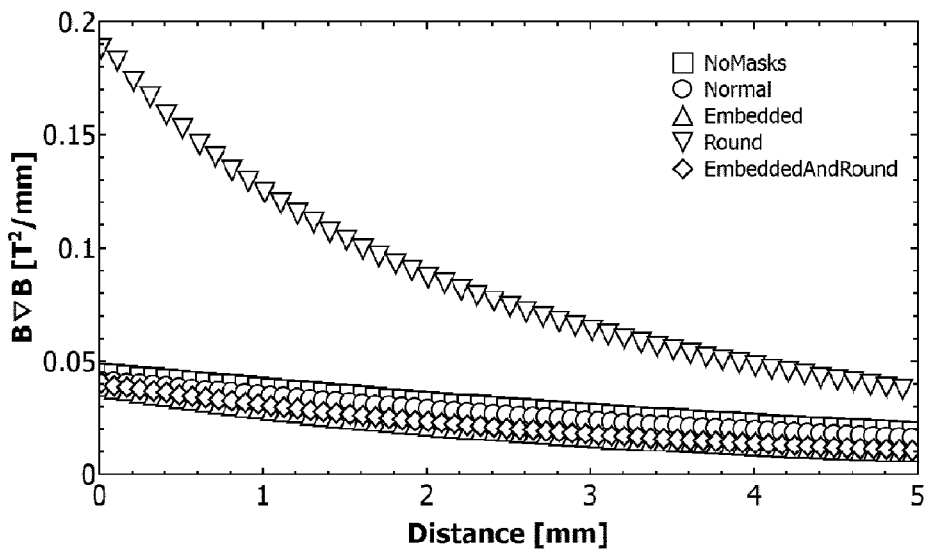
FIGS. 14 to 19 show plots of the product $B\nabla B$ in the vertical direction (i.e.
perpendicular to the magnet surface) along lines at 5 mm, 4 mm, 3 mm, 2 mm, 1 mm and 0 mm from the centre of the magnet apparatus for a magnet pair with no mask and for the masked magnet pairs of FIGS. 4 to 7.
Figure 15:
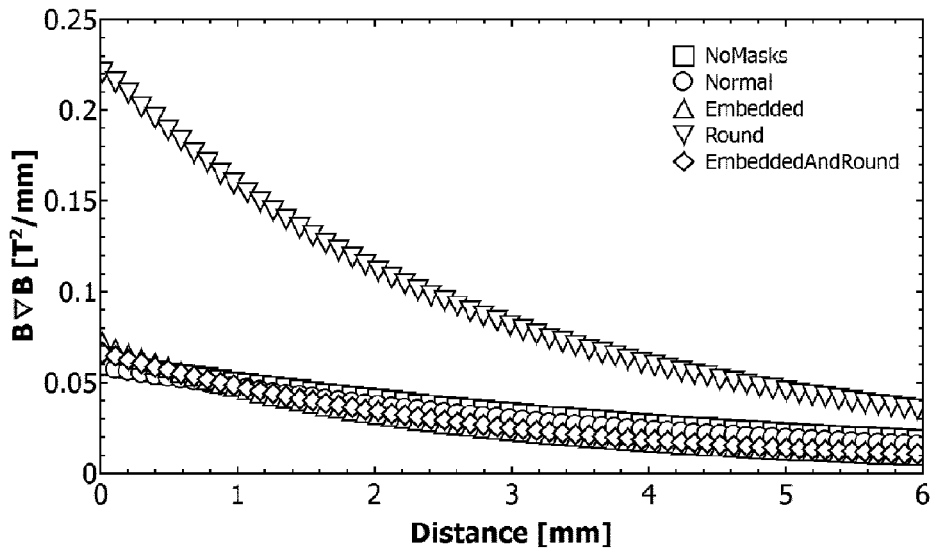
Figure 16:
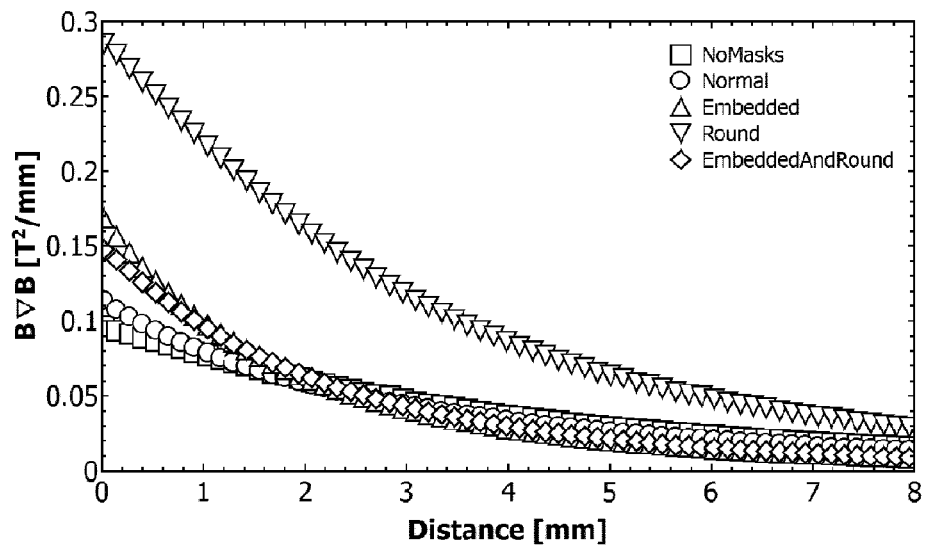
Figure 17:
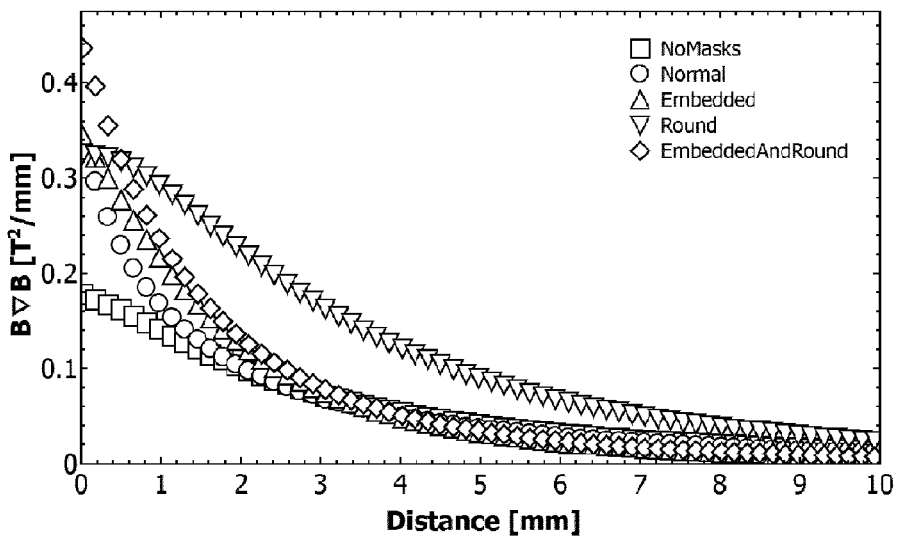
Figure 18:
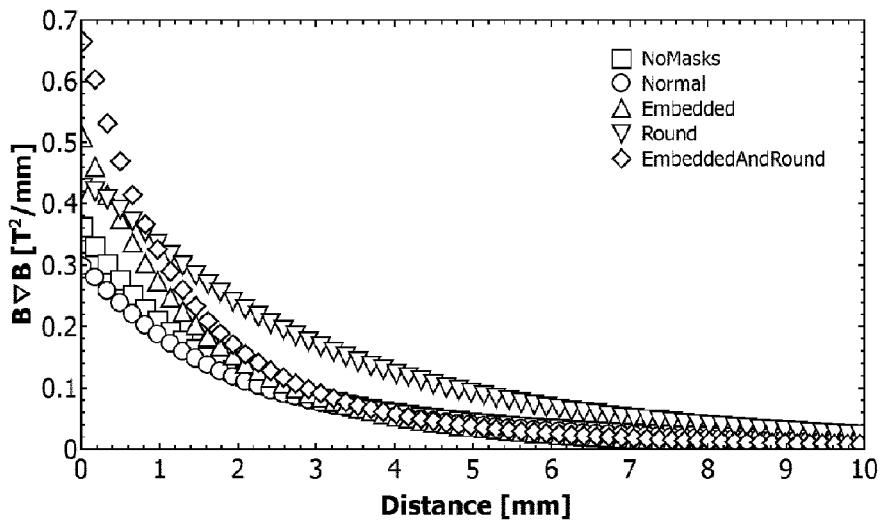
Figure 19:
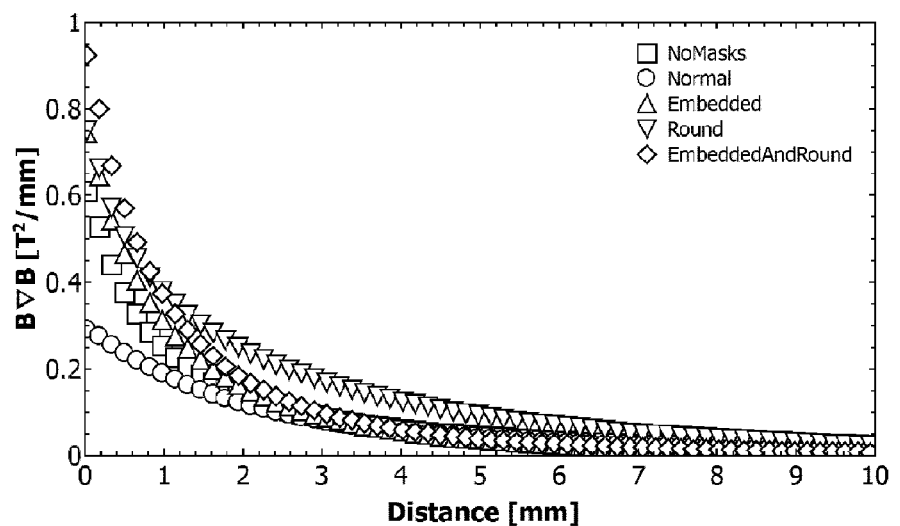

Again it will be understood that although the example of FIG. 45 uses an arrangement similar to that of FIG. 35 this is not essential and the magnet and mask geometry could be varied, for example using geometries as shown in FIGS. 5 to 7 or other geometries as discussed above. The shape and size of the additional magnet layers 13, 15 and of the further masking element 14 can be varied according to requirements and to suit the underlying mask and magnet geometry. In addition, whilst in FIG. 45 a further masking element 14 is shown and this uses a non-retentive material, it could be replaced with a magnetic element, in particular an arrangement of two-magnets placed side-by-side with their respective polarities oppositely oriented to each other and to the adjacent additional magnets 13, 15. There could also be alternative geometries with curved shapes, for example. The use of a rectangular geometry may be convenient but it is not essential.

Figure 47:
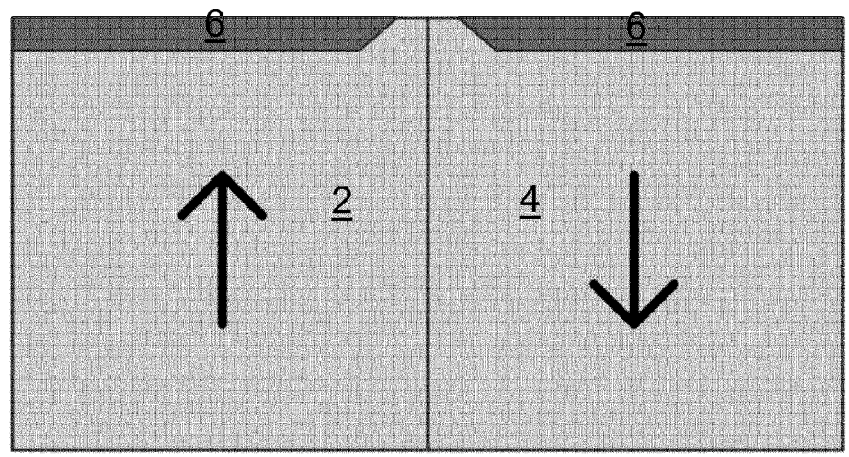
FIG. 47 is a further example for a possible geometry of the masks.
Figure 48:
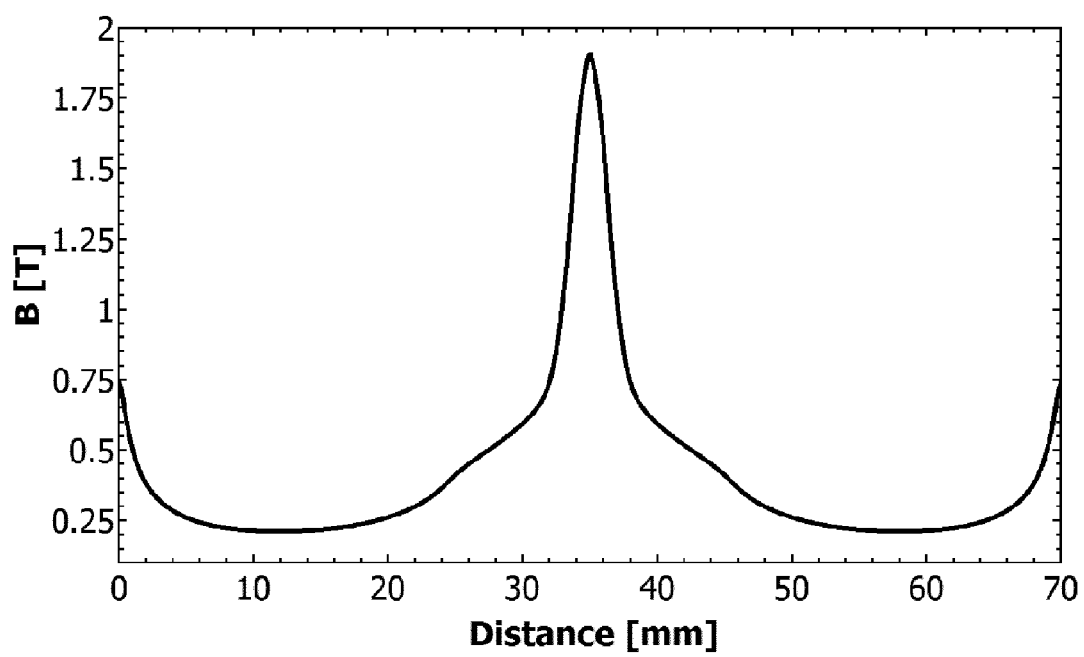
FIG. 48 shows the magnetic field strength for the geometry of FIG. 47.

A further example for a possible geometry of the masks is shown in FIG. 47. Here the two masks 6 have a trapezium cross-section, with the short side of the two parallel sides of the trapezium embedded in the permanent magnets 2, 4 and the long side of the 2 parallel sides forming the exposed surface of the mask. The trapezium has an angled side facing the join between the two magnets 2, 4 creating a tapered thickness for the masks 6 so that they can be thinner near the join line. FIG. 48 shows the simulated magnetic field strength for the geometry of FIG. 47. This arrangement is found to provide an increased peak in the magnetic field compared to a rectangular mask.

Figure 49:
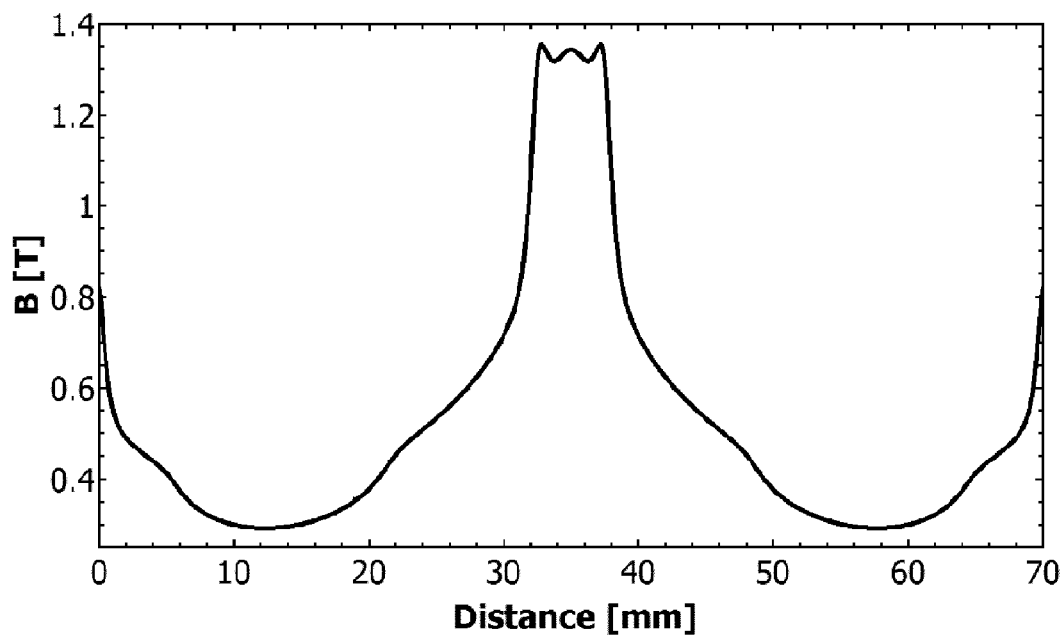
FIGS. 49 and 50 show the magnetic field and gradient of a magnet arrangement similar to that shown in FIG. 4.
Figure 50:
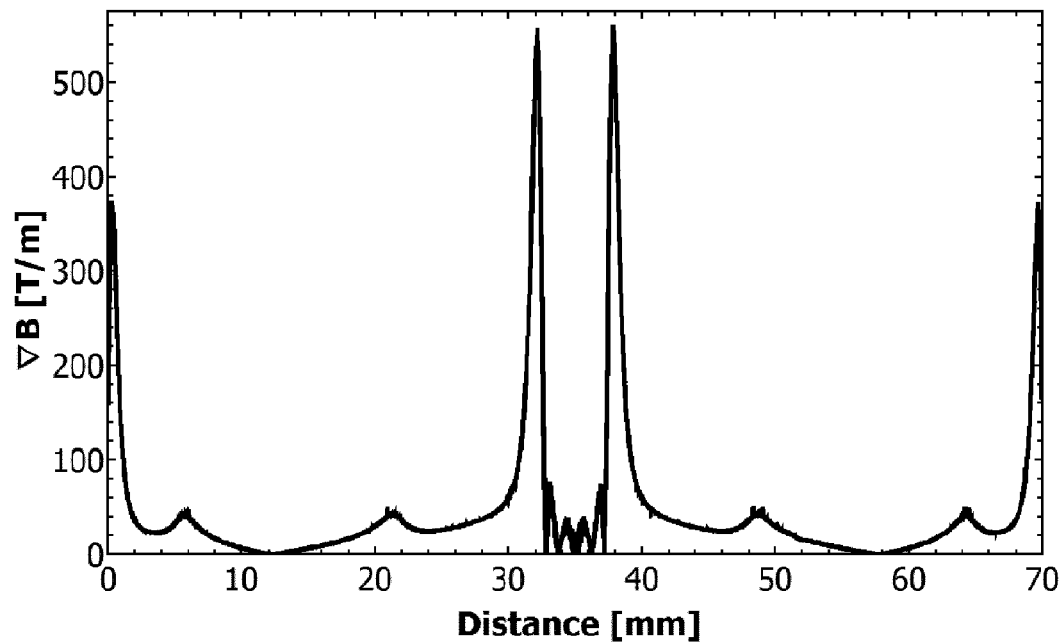
Figure 52:
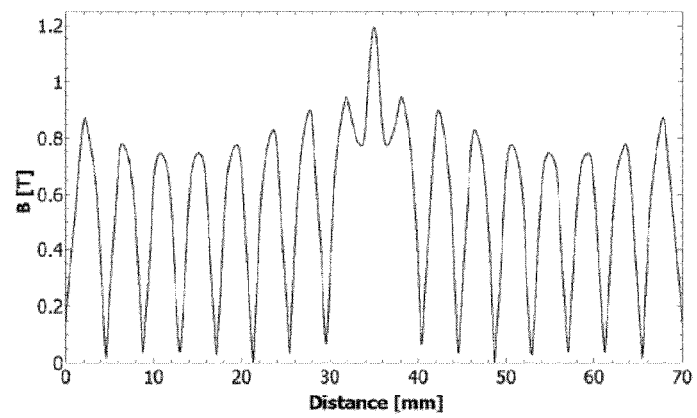
FIGS. 52 and 53 show the magnetic field and gradient of the simulated magnet arrangement of FIG. 51.
Figure 53:
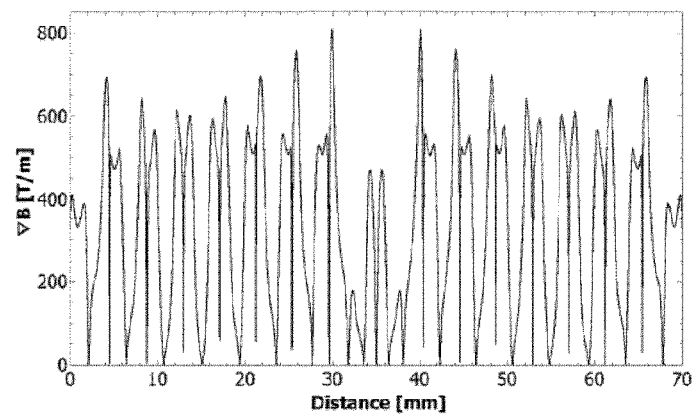
Figure 55:
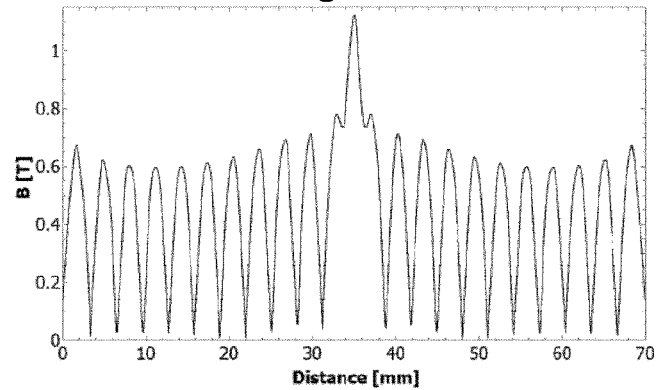
FIGS. 55 and 56 show the magnetic field and gradient of the simulated magnet arrangement of FIG. 54.
Figure 56:
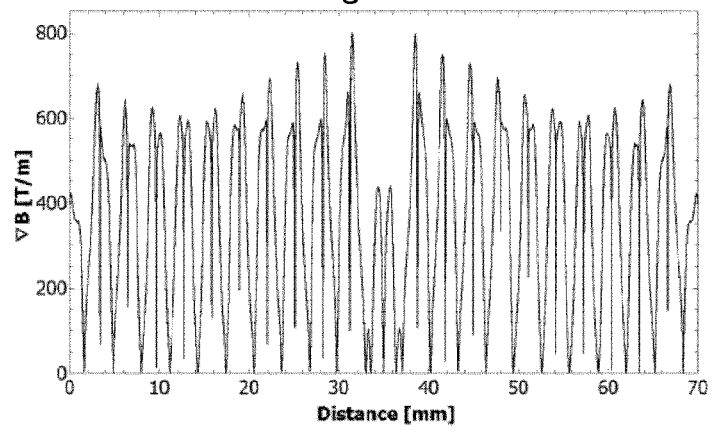

More complex geometries are also possible as shown in FIGS. 51 and 54, for example. In order to provide an indication of the comparative performance of these geometries FIGS. 49 and 50 show the magnetic field and gradient of a magnet arrangement similar to that shown in FIG. 4, whereas FIGS. 52 and 53 show the magnetic field and gradient of the simulated magnet arrangement of FIG. 51; and FIGS. 55 and 56 show the magnetic field and gradient of the simulated magnet arrangement of FIG. 54. The magnetic fields were measured 0.5 mm above the surface of the magnets/masks in COMSOL 4.4. For these examples the additional masks either side of the central masks are made of permanent magnet material. It will however be appreciated that they could also be made of a non-retentive material similar to the material of the central masks.

FIG. 51 shows simulated magnetic flux density for an example geometry where two central masks 6 of non-retentive material are flanked by a sequence of additional masks 16 made of permanent magnet material. In this example there are eight additional masks 16 on either side of the two central masks 6 and the central masks 6 have a reduced depth compared to the additional masks 16. The reason for the reduced depth in this example relates to the ease of manufacture of the non-retentive masks 6 and the permanent magnet masks 16 whilst prototyping, and it will be appreciated that similar advantages would arise if all of the masks 6, 16 had the same depth, although of course differing effects could be obtained by varying the depths of not only the central masks 6 but also the additional masks 16, and the widths of the masks 6, 16 could also be varied. The width of the additional masks 16 in this example is approximately 2 mm. The additional masks 16 are made of a permanent magnet material similar to the main magnets 2, 4, with the polarity in the opposite orientation.

The arrangement of FIG. 54 is similar to that of FIG. 51 but with twenty-two small magnet masks 16 instead of sixteen, i.e. eleven magnets either side of the central masks. The additional masks 16 are narrower and deeper than in FIG. 51, with a width of about 1 mm and a depth of about 5 mm.

It will be appreciated from comparison of the magnetic field gradients for the various designs that the use of multiple additional masks either side of the central masks produces repeated spikes with a high magnetic field gradient at a level larger than that found for the basic design of FIG. 4. Thus, improvements in the performance of the magnets will be realised where it is useful to have repeated peaks in magnetic field gradient and in magnetic field. FIGS. 57 and 58 show prototypes that were used to test the performance of the geometries simulated in relation to FIGS. 51 and 54. These tests are discussed in more detail below.

Another variation on the geometry is shown in FIG. 59. Here the width of the masks in cross-section is reduced. It is considered that the shorter masks will disrupt the magnetic field rather than guide it in comparison to longer masks as shown for example in FIG. 5 and also depicted here in a comparative example in FIG. 60. For FIG. 61 the thickness of the masks is 5 mm and the gap between the two masks is 2 mm. The width of the masks is 34 mm. The magnetic field will leak out from the mask near the centre of the two magnets. The magnetic gradient will have to maximum peaks close to the middle of the magnets. As can be seen from FIG. 61 the maximum peak of the gradient is about 0.8 T/mm. The narrow masks of FIG. 59 have a thickness of 5 mm and width of 2 mm, and as for the wider masks in FIG. 60 the gap between the masks is 2 mm. Further simulations using this arrangement found that the mask depth that produces the largest magnetic gradients is a thickness of 2 mm.

FIG. 61 shows a comparison between magnetic gradients with the mask arrangement as in FIG. 60 and with narrower masks similar to those shown in FIG. 59, but with a depth of just 2 mm. It will be appreciated that with the narrow mask it is possible to produce both larger magnetic gradients and an increased number of peaks.

One possible application for the magnet apparatus described herein is for separation of particles, and in particular for separation of nanoparticles having differing paramagnetic and/or differing diamagnetic properties. The magnet apparatus is able to provide an improved separation compared to the prior art devices, for example the device of US 2010/012591.

The force required to drag a magnetic particle out of a medium by a magnet is dependent on the product of the magnetic field B and gradient ∇B as well as on the size of the particle:

$$F_{mag} \propto r^3 \cdot B\nabla B,$$

where r is the radius of the particle.

The magnetic force acting on a 1 μm particle is 1000 times higher than for a 100 nm particle since the force is proportional to the cube of the particle's radius. This means that the product of the magnetic field and magnetic gradient B∇B becomes increasingly important as the particle size falls in the nanometer range <100 nm. The improvements described herein allow for this product to be increased compared to the prior art device. The devices described above will therefore be able to separate out considerably smaller nanoparticles than the magnet described in US 2010/0012591. In order to get a large force on the particles one can direct the particles through small microfluidic channels over the magnets, for example channels formed in a cylindrical sample container. Microfluidics allows small volumes of particles in a fluid to be sent over the magnets at low velocities. The particles will be separated out of the fluid and will stick to the walls of the channels closest to the magnet.

In addition, if geometries of the type shown in FIGS. 51, 54, 57 and 58 are used then the repeated peaks in the magnetic field and gradient will allow for improved separation, since in effect there are multiple 'steps' for the particles to pass, and hence multiple opportunities for separating the particles from the fluid. Tests were carried out using the prototypes of FIGS. 57 and 58.

Particles were pumped over the surface of the magnets by a syringe pump. The tube had an inner diameter of 0.3 mm and an outer diameter of 0.76 mm. A MS2G Single Frequency Sensor connected to a MS3 magnetic susceptibility meter (Bartington Instruments) measured the susceptibility of the samples. Two tests were performed using microparticles and using nanoparticles.

The microparticles used were Dynabeads Myone (Thermo Fisher Scientific) with a diameter of 1.05 μm. The particles were in a buffer of distilled water and glycerin. The sample was made by mixing 50 μl of the particles with 1.2 ml distilled water. The pumping speed was 75 ml/hr. The nanoparticles used were fluid MAG-DX (Chemicell) with a diameter of 100 nm. 10 μl of the particles were mixed with 1 ml distilled water. The pumping speed was 10 ml/hr.

The measured susceptibilities of the samples after the separations were compared to the susceptibility of a sample that has not been separated. One can then calculate the amount of particles that have been separated out of the mixture by the magnets. The measured susceptibilities of the different samples of microparticles after the separations are listed in Table 1 with reference to a prior art Open Kittel magnet (as in FIG. 1), a masked 'GIAMAG' magnet as in FIG. 4, a short mask design as in FIG. 59, a multiple mask solution as in FIG. 51/FIG. 57 and a multiple mask arrangement as in FIG. 54/FIG. 58. Both of the prototypes perform well and the FIG. 57 arrangement is the most efficient design for separation of microparticles in this test. It is almost 5 times more efficient than the basic 'GIAMAG' mask design of FIG. 4. The Open Kittel design is a bit better than the basic mask design of FIG. 4. This is because the force required for separating these particles is not very high. The Open Kittel will have a larger area over the surface of the magnet where the gradient is large enough for the separation of these particles than the basic mask design of FIG. 4.

TABLE 3 microparticles

| Sample | Measured Susceptibility [10$^{-6}$] | Amount Separated [10$^{-6}$] |
|---|---|---|
| No separation | 46.20 | — |
| Open Kittel | 36.13 | 10.07 |
| GIAMAG | 38.38 | 7.82 |
| Short masks | 31.99 | 14.21 |
| FIG. 57 | 13.05 | 33.15 |
| FIG. 58 | 22.56 | 23.64 |

The measured susceptibility of the different samples of nanoparticles after the separations are listed in Table 2 for the same geometries as tested for Table 1. The FIG. 58 magnet is the most efficient design in this test. This design is over 3.5 times more efficient than the basic mask design of FIG. 4. The FIG. 4 magnet design is considerably more efficient than the Open Kittel design. The force required to separate these particles are larger than for the microparticles so the masked arrangement provides improvements.

TABLE 4 nanoparticles

| Sample | Measured Susceptibility [10$^{-6}$] | Amount Separated [10$^{-6}$] |
|---|---|---|
| No separation | 506.84 | — |
| Open Kittel | 502.50 | 4.34 |
| GIAMAG | 497.39 | 9.45 |
| Short masks | 499.20 | 7.64 |
| FIG. 57 | 472.80 | 34.04 |
| FIG. 58 | 469.12 | 37.72 |

It is clear from the simulations and the experiments that the designs with multiple narrow masks and using additional masks made of permanent magnets are considerably better at separating particles than the less complex magnet designs.

FIG. 62 shows another example geometry using an array of square masks. This type of arrangement could be adapted to have masks of any shape, and any number of masks. In these examples the masks are all adjacent to the joining line, but it would also be possible to have additional masks spaced apart from the joining line and on the other side of the central masks, for example to have additional masks to those shown in FIGS. 57 and 58, but in a grid pattern rather than as a series of strips.

FIG. 63 shows a further possibility, where magnet masks 16 with polarities perpendicular to the polarity of the underlying magnets 2, 4 are combined with non-retentive masks 6 at the centre.

As well as separation of particles, the magnet apparatuses described herein can be used for other purposes. For example, the magnet apparatus may be used for separation of molecules in fluids or for applications using electromagnetic induction to generate electrical currents. The magnet apparatus has benefits in any situation where high magnetic field strength or large gradients in the magnetic field are required.

Any of the geometries described herein could be used with two sets of magnets in face-to-face arrangement as in FIGS. 20-22 for example. Thus, the geometries with multiple masks as in FIG. 51 and so on could be used in such an arrangement.

The invention claimed is:

1. A magnet apparatus for generating at least one of a high gradient and a high strength magnetic field, the magnet apparatus comprising:
   two permanent magnets located side-by-side with oppositely oriented magnetic field polarities and end surfaces of opposite polarities next to one another, the magnetic anisotropy of the magnets exceeding the magnetic induction of the material of the magnets;
   at least one mask on a first end of each of the adjacent permanent magnets, the at least one mask comprising a non-retentive material covering adjacent end surfaces of the two permanent magnets with a gap along a joining line between the two permanent magnets to form a zone of high-gradient magnetic field above the joining line; and
   the at least one mask is at least one of embedded within the magnets and has a varying thickness.

2. The magnet apparatus as claimed in claim 1, wherein at least one of the varying thickness and the embedding is utilized such that the exposed surface of the at least one mask meets and intersects with the exposed end surface of the magnet at the edge of the at least one mask adjacent to the gap.

3. The magnet apparatus as claimed in claim 1, wherein the angle between a tangent to the at least one mask surface and a tangent to the magnet surface at the meeting point of the surfaces is less than 60 degrees.

4. The magnet apparatus as claimed in claim 1, wherein the at least one mask each has a maximum thickness that is greater than the width of the gap.

5. The magnet apparatus as claimed in claim 1, wherein the thickness of the at least one mask is less than five times the width of the gap.

6. The magnet apparatus as claimed in, claim 1 wherein the thickness of the at least one mask is greater than a fifth of the thickness of the magnet.

7. A The magnet apparatus as claimed in claim 1, further comprising three or more magnets arranged side-by-side with adjacent magnets having oppositely oriented polarities, and masks for each magnet with gaps along the each of joining lines between side-by-side magnets.

8. The magnet apparatus as claimed in claim 1, wherein the gap width is greater than a tenth of the thickness of the magnet.

9. The magnet apparatus as claimed in claim 1, wherein at least one of the at least one mask is at least 0.5 mm thick and the gap is at least 0.5 mm thick.

10. The magnet apparatus as claimed in claim 1, wherein the at least one mask includes both embedded parts and a varying thickness.

11. A The magnet apparatus as claimed in claim 1, wherein at least part of the at least one mask has a rectangular cross-section embedded in a recess of a corresponding cross-section in the magnet.

12. The magnet apparatus as claimed in claim 1, wherein the at least one mask has a rounded exposed surface.

13. The magnet apparatus as claimed in claim 1, wherein the at least one mask has a curved cut-out section adjacent the gap.

14. The magnet apparatus as claimed in claim 1, wherein the at least one mask and the magnets, have cut-out sections that together form part of the circumference of a cylinder centered above the join between the magnets.

15. The magnet apparatus as claimed in claim 1, further comprising one mask on a first end of each of the two permanent magnets forming two central magnet masks, along with additional masks beside each of the two central masks, the additional masks being further from the joining line and spaced apart from the two central masks along the end surfaces of the two permanent magnets.

16. The magnet apparatus as claimed in claim 15, wherein the additional masks are made of a permanent magnet material oriented with the polarity of the magnet of the mask out of alignment with the polarity of the magnet that is being masked.

17. The magnet apparatus as claimed in claim 15, wherein the additional masks are at least one of embedded within the two main permanent magnets and have a varying thickness.

18. The magnet apparatus as claimed in claim 15 wherein the additional masks each have the same size and geometry.

19. The magnet apparatus as claimed in claim 15, wherein at least one of the additional masks have the same size and geometry as the two central masks.

20. The magnet apparatus as claimed in claim 1, in which the at least one mask has one surface in contact with the respective magnets, there is an air gap at the other surface of the at least one mask, and the apparatus includes further mask layers beyond the air gap.

21. The magnet apparatus as claimed in claim 1, wherein a first surface of the at least one mask is in contact with the magnets, and an additional magnet layer is present at the other surface of each of the at least one mask.

22. The magnet apparatus as claimed in claim 21, further comprising a further masking element placed in the gap between the additional magnet layers.

23. The magnet apparatus as claimed in claim 1, wherein the orientation of the magnets can be varied relative to a working element, such as a container with particles to be separated.

24. The magnet apparatus as claimed in claim 23, further comprising a rotating wheel allowing for the magnets and the at least one mask to be rotated in-plane relative to the working element.

25. The magnet apparatus as claimed in claim 1, further comprising a first set of magnets, with masks, as well as a second set of magnets, with masks, the first set of magnets and the second set of magnets facing each other.

26. The magnet apparatus as claimed in claim 25, wherein the two sets of magnets face each other with parallel gaps.

27. The magnet apparatus as claimed in claim 25, wherein the two sets of magnets face each other with non-parallel gaps.

28. The magnet apparatus as claimed in claim 25, wherein the two sets of magnets are arranged for relative rotational movement about an axis extending along a normal to the joining line.

29. The magnet apparatus as claimed in claim 1, wherein the magnet pairs have masks on both of the end faces, generating a double sided arrangement.

30. The magnet apparatus as claimed in any of claim 1, wherein the magnets are mounted on a yoke that is joined to the magnets at the opposite end to the at least one mask.

31. The magnet apparatus as claimed in claim 30, wherein the thickness of the yoke is similar to the thickness of the at least one mask.

32. The magnet apparatus of claim 1, further comprising an apparatus for separation of particles of differing types having at least one of different paramagnetic and diamagnetic properties.

33. A method of generating at least one of a high gradient and high strength magnetic field, the method comprising providing a magnet apparatus, the magnet apparatus comprising:
- two permanent magnets located side-by-side with oppositely oriented magnetic field polarities and end surfaces of opposite polarities next to one another, the magnetic anisotropy of the magnets exceeding the magnetic induction of the material of the magnets;
- at least one mask on a first end of each of the adjacent permanent magnets, the at least one mask comprising a non-retentive material covering adjacent end surfaces of the two permanent magnets with a gap along a joining line between the two permanent magnets to form a zone of high-gradient magnetic field above the joining line; and
- at least one mask is at least one of embedded within the magnets and has a varying thickness.

34. A method for separation of particles comprising:
using a magnet apparatus, the magnet apparatus comprising:
- two permanent magnets located side-by-side with oppositely oriented magnetic field polarities and end surfaces of opposite polarities next to one another, the magnetic anisotropy of the magnets exceeding the magnetic induction of the material of the magnets;
- at least one mask on a first end of each of the adjacent permanent magnets, the at least one mask comprising a non-retentive material covering adjacent end surfaces of the two permanent magnets with a gap along a joining line between the two permanent magnets to form a zone of high-gradient magnetic field above the joining line; and
- at least one mask is at least one of embedded within the magnets and has a varying thickness; and exposing the particles to be separated to the magnetic field generated by the magnet apparatus.

* * * * *